(12) United States Patent
Ghosh et al.

(10) Patent No.: US 7,916,628 B2
(45) Date of Patent: Mar. 29, 2011

(54) TRUNKING FOR FABRIC PORTS IN FIBRE CHANNEL SWITCHES AND ATTACHED DEVICES

(75) Inventors: Kalyan K. Ghosh, Santa Clara, CA (US); Praveen Jain, San Jose, CA (US); Shashank Gupta, San Jose, CA (US); Tushar Desai, Foster City, CA (US)

(73) Assignee: Cisco Technology, Inc., San Jose, CA (US)

( * ) Notice: Subject to any disclaimer, the term of this patent is extended or adjusted under 35 U.S.C. 154(b) by 1643 days.

(21) Appl. No.: 10/979,886

(22) Filed: Nov. 1, 2004

(65) Prior Publication Data
US 2006/0092932 A1    May 4, 2006

(51) Int. Cl.
*G01R 31/08*    (2006.01)
(52) U.S. Cl. ......... 370/218; 370/235; 370/252; 709/250
(58) Field of Classification Search ................... 370/218, 370/235, 252, 389, 401; 709/220, 223, 226, 709/238, 250
See application file for complete search history.

(56) References Cited

U.S. PATENT DOCUMENTS

| | | | |
|---|---|---|---|
| 5,428,471 A | 6/1995 | McDermott | |
| 5,506,838 A | 4/1996 | Flanagan | |
| 5,617,421 A | 4/1997 | Chin et al. | |
| 5,619,497 A | 4/1997 | Gallagher et al. | |
| 5,675,741 A | 10/1997 | Aggarwal et al. | |
| 5,682,479 A | 10/1997 | Newhall et al. | |
| 5,708,659 A | 1/1998 | Rostoker et al. | |
| 5,740,159 A | 4/1998 | Ahmad et al. | |
| 5,740,171 A | 4/1998 | Mazzola et al. | |
| 5,742,604 A | 4/1998 | Edsall et al. | |
| 5,764,636 A | 6/1998 | Edsall | |
| 5,793,976 A | 8/1998 | Chen et al. | |
| 5,809,285 A | 9/1998 | Hilland | |
| 5,818,603 A | 10/1998 | Motoyama | |
| 5,819,112 A | 10/1998 | Kusters | |
| 5,862,125 A | 1/1999 | Russ | |

(Continued)

FOREIGN PATENT DOCUMENTS

EP    0772121 A    5/1997

(Continued)

OTHER PUBLICATIONS

Listanti et al., "Architectural and Technological Issues for Future Optical Internet Networks", IEEE Communication Magazine, Sep. 2000.

(Continued)

*Primary Examiner* — Jayanti K Patel
*Assistant Examiner* — Jung Park
(74) *Attorney, Agent, or Firm* — Weaver Austin Villeneuve & Sampson LLP

(57) ABSTRACT

N_Ports and F_Ports are provided with logic allowing designation of multiple virtual interfaces on a single host bus adaptor or other Fiber Channel interface, one virtual interface for each VSAN operating on the node interface. Node ports with this additional functionality are referred to as trunking N_Ports or TN_Ports. These ports have a functional design allowing creation of the multiple virtual interfaces as appropriate for the application at hand. This port design also includes logic for communicating with a peer fabric port to initialize and modify the configuration of the virtual interfaces on the TN_Port. A corresponding functional design and communication logic is provided for fabric ports, referred to herein as trunking F_Ports or TF_Ports.

42 Claims, 9 Drawing Sheets

U.S. PATENT DOCUMENTS

| | | |
|---|---|---|
| 5,959,972 A | 9/1999 | Hamami |
| 5,959,990 A | 9/1999 | Frantz et al. |
| 5,964,841 A | 10/1999 | Rekhter |
| 5,999,930 A | 12/1999 | Wolff |
| 6,035,105 A | 3/2000 | McCloghrie et al. |
| 6,046,985 A | 4/2000 | Aldred |
| 6,101,497 A | 8/2000 | Ofek |
| 6,160,813 A | 12/2000 | Banks et al. |
| 6,188,668 B1 | 2/2001 | Brewer et al. |
| 6,188,694 B1 | 2/2001 | Fine et al. |
| 6,202,135 B1 | 3/2001 | Kedem et al. |
| 6,205,488 B1 | 3/2001 | Casey et al. |
| 6,208,623 B1 | 3/2001 | Rochberger et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,226,771 B1 | 5/2001 | Hilla et al. |
| 6,243,358 B1 | 6/2001 | Monin |
| 6,260,120 B1 | 7/2001 | Blumenau et al. |
| 6,262,977 B1 | 7/2001 | Seaman et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,296 B1 | 9/2001 | Tappan |
| 6,295,575 B1 | 9/2001 | Blumenau et al. |
| 6,310,884 B1 | 10/2001 | Odenwald, Jr. |
| 6,330,614 B1 | 12/2001 | Aggarwai et al. |
| 6,337,861 B1 | 1/2002 | Rosen |
| 7,406,034 B1 | 4/2002 | Cometto et al. |
| 6,388,995 B1 | 5/2002 | Gai et al. |
| 6,408,001 B1 | 6/2002 | Chuah et al. |
| 6,426,952 B1 | 7/2002 | Francis et al. |
| 6,438,612 B1 | 8/2002 | Ylonen et al. |
| 6,473,421 B1 | 10/2002 | Tappan |
| 6,493,349 B1 | 12/2002 | Casey |
| 6,529,963 B1 | 3/2003 | Fredin et al. |
| 6,532,212 B1 | 3/2003 | Soloway et al. |
| 6,597,663 B1 | 7/2003 | Rekhter |
| 6,604,407 B2 | 8/2003 | Kano |
| 6,643,287 B1 | 11/2003 | Callon et al. |
| 6,661,773 B1 | 12/2003 | Pelissier et al. |
| 6,674,760 B1 | 1/2004 | Walrand et al. |
| 6,728,220 B2 | 4/2004 | Behzadi |
| 6,728,848 B2 | 4/2004 | Tamura et al. |
| 6,766,482 B1 | 7/2004 | Yip et al. |
| 6,775,230 B1 | 8/2004 | Watanabe et al. |
| 6,804,776 B1 | 10/2004 | Lothberg et al. |
| 6,848,007 B1 | 1/2005 | Reynolds et al. |
| 6,859,435 B1 | 2/2005 | Lee et al. |
| 6,879,560 B1 | 4/2005 | Cahn |
| 6,904,053 B1 | 6/2005 | Berman |
| 6,915,358 B2 | 7/2005 | Horton et al. |
| 6,920,133 B1 | 7/2005 | Boodaghians |
| 6,920,153 B2 | 7/2005 | Ellis et al. |
| 6,920,154 B1 | 7/2005 | Achler |
| 6,947,379 B1 | 9/2005 | Gleichauf et al. |
| 6,959,151 B1 | 10/2005 | Cotter et al. |
| 6,975,589 B2 | 12/2005 | Luft et al. |
| 6,985,490 B2 | 1/2006 | Czeiger et al. |
| 7,006,525 B1 | 2/2006 | Jha |
| 7,026,288 B2 | 4/2006 | Judice et al. |
| 7,027,406 B1 | 4/2006 | Shabtay et al. |
| 7,046,679 B2 | 5/2006 | Sampath |
| 7,050,392 B2 | 5/2006 | Valdevit |
| 7,054,304 B2 | 5/2006 | Wang |
| 7,061,858 B1 | 6/2006 | Di Benedetto et al. |
| 7,072,298 B2 | 7/2006 | Paul et al. |
| 7,076,594 B2 | 7/2006 | Benedetto et al. |
| 7,079,544 B2 | 7/2006 | Wakayama et al. |
| 7,082,140 B1 | 7/2006 | Hass |
| 7,085,846 B2 | 8/2006 | Jenne et al. |
| 7,155,494 B2 | 12/2006 | Czeiger et al. |
| 7,161,935 B2 | 1/2007 | Alonso et al. |
| 7,206,288 B2 | 4/2007 | Cometto et al. |
| 7,216,158 B2 | 5/2007 | Revanuru et al. |
| 7,221,652 B1 | 5/2007 | Singh et al. |
| 7,275,103 B1* | 9/2007 | Thrasher et al. ............ 709/224 |
| 7,301,898 B1 | 11/2007 | Martin et al. |
| 7,302,494 B2 | 11/2007 | Hayashi et al. |
| 7,319,669 B1 | 1/2008 | Kunz et al. |
| 7,328,260 B1* | 2/2008 | Muthiyan et al. ............ 709/224 |
| 7,330,892 B2 | 2/2008 | Ibrahim |
| 7,355,983 B2 | 4/2008 | Scudder et al. |
| 7,366,194 B2 | 4/2008 | Yu et al. |
| 7,376,755 B2 | 5/2008 | Pandya |
| 7,433,326 B2 | 10/2008 | Desai et al. |
| 7,443,799 B2 | 10/2008 | Varanasi et al. |
| 7,447,224 B2 | 11/2008 | Dropps |
| 7,586,947 B2 | 9/2009 | Miki et al. |
| 7,593,324 B2 | 9/2009 | Jain et al. |
| 7,599,360 B2 | 10/2009 | Edsall et al. |
| 7,616,637 B1 | 11/2009 | Lee et al. |
| 7,649,844 B2 | 1/2010 | Bector et al. |
| 2001/0020254 A1 | 9/2001 | Blumenau et al. |
| 2001/0049739 A1 | 12/2001 | Wakayama et al. |
| 2002/0009081 A1 | 1/2002 | Sampath et al. |
| 2002/0034178 A1 | 3/2002 | Schmidt et al. |
| 2002/0075873 A1 | 6/2002 | Lindhorst-Ko et al. |
| 2002/0085493 A1 | 7/2002 | Pekkala et al. |
| 2002/0101868 A1 | 8/2002 | Clear et al. |
| 2002/0110125 A1 | 8/2002 | Banks et al. |
| 2002/0133740 A1 | 9/2002 | Oldfield et al. |
| 2002/0150039 A1 | 10/2002 | Valdevit et al. |
| 2002/0152338 A1 | 10/2002 | Elliott et al. |
| 2002/0156918 A1 | 10/2002 | Valdevit et al. |
| 2002/0156924 A1 | 10/2002 | Czeiger et al. |
| 2002/0176434 A1 | 11/2002 | Yu et al. |
| 2002/0188754 A1 | 12/2002 | Foster et al. |
| 2003/0012204 A1 | 1/2003 | Czeiger et al. |
| 2003/0016624 A1 | 1/2003 | Bare |
| 2003/0067925 A1 | 4/2003 | Choe et al. |
| 2003/0101239 A1 | 5/2003 | Ishizaki |
| 2003/0107987 A1 | 6/2003 | Kinstler |
| 2003/0118053 A1* | 6/2003 | Edsall et al. .................. 370/474 |
| 2003/0145116 A1 | 7/2003 | Moroney et al. |
| 2003/0149848 A1 | 8/2003 | Ibrahim et al. |
| 2003/0163727 A1 | 8/2003 | Hammons et al. |
| 2003/0189929 A1 | 10/2003 | Matsuzaki et al. |
| 2003/0198247 A1 | 10/2003 | Gardner et al. |
| 2004/0028060 A1 | 2/2004 | Kang |
| 2004/0151174 A1 | 8/2004 | Del Signore et al. |
| 2004/0151188 A1* | 8/2004 | Maveli et al. ................. 370/398 |
| 2004/0230787 A1 | 11/2004 | Blumenau et al. |
| 2004/0233921 A1 | 11/2004 | Krieg et al. |
| 2005/0018606 A1 | 1/2005 | Dropps |
| 2005/0018663 A1 | 1/2005 | Dropps |
| 2005/0018701 A1 | 1/2005 | Dropps |
| 2005/0036499 A1 | 2/2005 | Dutt et al. |
| 2005/0080903 A1 | 4/2005 | Valenci |
| 2005/0088969 A1 | 4/2005 | Carlsen et al. |
| 2005/0108444 A1 | 5/2005 | Flauaus |
| 2005/0117562 A1 | 6/2005 | Wrenn |
| 2005/0177634 A1 | 8/2005 | Scudder et al. |
| 2005/0249123 A1 | 11/2005 | Finn |
| 2005/0267965 A1 | 12/2005 | Heller |
| 2006/0034302 A1 | 2/2006 | Peterson |
| 2006/0038263 A1 | 2/2006 | Eigner et al. |
| 2006/0087963 A1 | 4/2006 | Jain et al. |
| 2006/0117212 A1 | 6/2006 | Meyer et al. |
| 2006/0153186 A1 | 7/2006 | Bector |
| 2006/0159081 A1 | 7/2006 | Dropps |
| 2007/0153816 A1 | 7/2007 | Cometto et al. |
| 2008/0028096 A1* | 1/2008 | Henderson et al. ........... 709/236 |
| 2008/0316942 A1 | 12/2008 | Desai et al. |
| 2009/0141657 A1 | 6/2009 | Dutt et al. |
| 2010/0008375 A1 | 1/2010 | Lee et al. |

FOREIGN PATENT DOCUMENTS

| | | |
|---|---|---|
| EP | 1134938 | 9/2001 |
| EP | 1187406 | 3/2002 |
| JP | 2-209044 | 8/1990 |
| JP | 10-293633 | 11/1998 |
| JP | 2000-22699 | 2/2000 |
| JP | 2001-154929 | 6/2001 |
| JP | 2001-320420 | 11/2001 |
| JP | 2001-345865 | 12/2001 |
| WO | WO 00/31925 | 6/2000 |

| | | |
|---|---|---|
| WO | 01/19027 | 3/2001 |
| WO | WO 01/95565 | 12/2001 |
| WO | WO 02/071224 | 12/2002 |

OTHER PUBLICATIONS

K. White, IBM Corp, RFC 2925, Sep. 2000.
DeSanti et al., "Tagged Frame Specification," Tagged Frame Spec., T11/03-353v0, May 2003, 4 pages.
Claudio DeSanti, "Virtual Fabrics", T11/03-220v0, PowerPoint presentation, Apr. 2003, 11 pages.
Cisco Systems, "Cisco SAN-OS", 1992-2003 Cisco Systems, Inc. pp. 1-7.
Cisco Systems, "Cisco MDS 9000 Family of Multilayer Directors and Fabric Switches", 1992-2003 Cisco Systems, Inc., pp. 1-4.
Desai, Tushar et al., "Methods and Devices for Exchanging Peer Parameters Between Network Devices", U.S. Appl. No. 10/430,491, filed May 5, 2003, Publication No. US-2004-0100910-A1.
Gai, Silvano et al., "Methods and Apparatus for Encapsulating a Frame for Transmission in a Storage Area Network," U.S. Appl. No. 10/034,160, filed Dec. 26, 2001, Publication No. US-2003-0118053-A1.
PCT International Search Report, PCT/US02/41072, mailed May 23, 2003, 5 pages.
Armitage, Grenville, "MPLS: The Magic Behind the Myths," Jan. 2000, *IEEE Communications Magazine*, pp. 124-131.
DeSanti et al., "Tagged Frame Specification," Tagged Frame Spec., T11/03-353v0, May 2003, 4 pages.
Claudio DeSanti, "Virtual Fabrics N_Port Support", VF N_Support, T11/04-49v0, Jul. 2004, 13 pages.
Claudio DeSanti, "Virtual Fabrics", T11/03-220v0, PowerPoint presentation, Apr. 2003, 11 pages.
Claudio DeSanti, "Extended_Headers", VF N_Port Model, T11/04-627v1, Oct. 2004, 1 page.
Claudio DeSanti, "Virtual Fabrics Switch Support," VF Switch Support, T11/04-395v3, Oct. 2004, 15 pages.
Claudio DeSanti, "Virtual Fabrics N_Port Support", VF N_Port Support, T11/04-494v2, Oct. 2004, 14 pages.
Brocade Communication Systems, Inc. (2002-2003), "Optimizing the performance and management of 2Gbit/sec SAN fabrics with ISL trunking," White Paper (webprint).
Brocade Communication Systems, Inc. (Jun. 2001), "Increasing Intelligence with the SAN Fabric," White Paper (webprint), XP002251362.
Cisco Systems, Inc. (1992-2004), "Cisco SAN-OS Reference Guide," pp. 1-13.
Lee et al. (4/12002), "Label Switching in Fibre Channel Networks," U.S. Appl. No. 10/114,394.
Mills (Jul. 1988), "Network Working Group Request for Comments 1059, Network Time Protocol (Version 1) Specification and Implementation," University of Delaware, pp. 1-50.
Molero et al. (Dec. 7-9, 2000), "On the effect of link failure in fibre channel sotrage area networks," Parallel Architectures, Algorithms and Networks 2000, I-Span 2000 Proceedings, Int'l Symposium.
Monia (Dec. 12, 2000), "iFCP- A Protocol for Internet Fibre Channel Storage Networking" Nishan Systems (webprint), P002246205.
NCITS (Nov. 28, 2000), "Fibre Channel Generic Services-3 (FC-GS-3)," working draft.
NCITS (Feb. 19, 2003), "Fibre Channel Switch Fabric-3 (FC-SW-3)," working draft (XP002300830 (A,B,C)).
NCITS (Jun. 26, 2001), "Fibre Channel Switch Fabric-2 (FC-SW-2)." working draft.
Rajagopal et al. (Jun. 30, 1999), "IP and ARP Over Fibre Channel," Request for Comments: 2625 (webprint), XP002246207.
Rangan (Sep. 4, 2001), "Re: FCIP/1FCP: Gurantee In-Order delivery for FC N/NL ports," IP Storage—Mailing List Archive (http://www.pdl.cmu/edu/mailinglists/ips/mail/msg03069.html webprint).
Rosen et al. (Jan. 2001), "Multiprotocol Label Switching Architecture," Network Working Group, RFC 3031, XP002251364.
Valdevit (May 23, 2000), "Fabric Shortest Path First Version (FSPF) Rv. 0.2", Fabric Shortest Path (http://t11.org/index.htm webprint), XP002959525.
Fabric Shortest Path First (FSPF) Project 1508-D Switch Fabric-3 Rev. 6.5, (http://t11/org/index.htm webprint), pp. 117-140 (Oct. 31, 2003).
ATM Forum Committee, Chapter 10, "Flush Message Protocol Procedures and Frame Formats," *LAN Emulation Over ATM Version 2—LUNI Specification*, AF-Lane-0084.000, Jul. 1997, pp. 111-115.
White Paper, Link Aggregation According to IEEE Standard 802.3ad, Oct. 10, 2002, v.1.10, pp. 1-21.
Kiiskilä, Marko, "Implementation of LAN Emulation of ATM in Linux," *Tampereen Teknillinen Korkeakoulu*, Oct. 1996, 57 pages.
IEEE Std 802.3-2002, Chapter 43.5 Marker Protocol, *Part 3: Carrier Sense Multiple Access with Collision Detection (CSMA/CD) Access Method and Physical Layer Specifications*, 2002, pp. 329-345.
U.S. Appl. No. 10/114,568, Allowed claims.
Notice of Allowance issued Dec. 6, 2006 for U.S. Appl. No. 10/170,855.
Cometto et al., Allowed Claims for U.S. Appl. No. 10/170,855.
Notice of Allowance for U.S. Appl. No. 10/430,491 dated Apr. 23, 2008.
U.S. Office Action dated Feb. 23, 2007 from related U.S. Appl. No. 10/430,491.
U.S. Office Action dated Mar. 28, 2007 from related U.S. Appl. No. 10/791,143.
Non-Final Office Action for U.S. Appl. No. 11/027,252 mailed Oct. 29, 2007.
US Office Action (Oct. 17, 2006) from U.S. Appl. No. 10/114,394.
US Office Action (Oct. 23, 2006) from U.S. Appl. No. 10/114,568.
US Office Action (Dec. 13, 2005) from U.S. Appl. No. 10/034,160.
US Office Action (Feb. 5, 2007) from U.S. Appl. No. 10/034,160.
US Office Action (Apr. 4, 2007) from U.S. Appl. No. 10/114,394.
US Office Action (Apr. 6, 2007) from U.S. Appl. No. 10/114,568.
US Office Action (May 22, 2006) from U.S. Appl. No. 10/114,568.
US Office Action (May 22, 2006) from U.S. Appl. No. 10/170,855.
US Office Action (May 31, 2006) from U.S. Appl. No. 10/034,160.
US Office Action (Jul. 30, 2007) from U.S. Appl. No. 10/034,160.
US Office Action (Aug. 22, 2005) from U.S. Appl. No. 10/034,160.
US Office Action (Sep. 26, 2006) from U.S. Appl. No. 10/034,160.
WO Search Report (Oct. 17, 2003) from International Patent Application No. PCT/US03/09328.
WO Search Report (Oct. 25, 2006) from International Patent Application No. PCT/US05/37763.
WO Search Report (Oct. 27, 2007) from International Patent Application No. PCT/US2004/020518.
WO Search Report (Nov. 4, 2003) from International Patent Application No. PCT/US03/18765.
WO Search Report (Jul. 12, 2004) from International Patent Application No. PCT/US03/36452.
WO Search Report (Jul. 15, 2003) from International Patent Application No. PCT/US03/09442.
WO Written Opinion (Oct. 25, 2006) from International Patent Application No. PCT/US05/37763.
PCT International Preliminary Report on Patentability dated Dec. 29, 2004 from related PCT/US05/044726.
US Final Office Action for U.S. Appl. No. 10/034,160 mailed Jan. 29, 2008.
US Notice of Allowance for U.S. Appl. No. 10/114,568 mailed Mar. 26, 2008.
US Non-Final Office Action for U.S. Appl. No. 10/114,568 mailed Sep. 20, 2007.
US Non-Final Office Action for U.S. Appl. No. 10/114,394 mailed Aug. 22, 2007.
US Non-Final Office Action for U.S. Appl. No. 10/114,394 mailed Feb. 6, 2008.
US Final Office Action for U.S. Appl. No. 10/430,491 mailed Aug. 9, 2007.
US Notice of Allowance for U.S. Appl. No. 10/430,491 mailed Nov. 23, 2007.
US Non-Final Office Action for U.S. Appl. No. 10/609,442 mailed Mar. 28, 2007.
US Final Office Action for U.S. Appl. No. 10/609,442 mailed Sep. 5, 2007.
US Non-Final Office Action for U.S. Appl. No. 10/609,442 mailed Mar. 28, 2008.

US Notice of Allowance for U.S. Appl. No. 10/974,368 mailed May 1, 2008.
US Non-Final Office Action for U.S. Appl. No. 10/974,368 mailed Sep. 10, 2007.
EP Office Action dated Jan. 18, 2005 from related EP Application No. 02799279.1-1525.
EP Office Action dated Oct. 18, 2005 from related EP Application No. 02799279.1-1525.
EP Office Action dated Feb. 20, 2006 from related EP Application No. 02799279.1-1525.
EP Office Action Application No. 03789766.7, mailed Nov. 6, 2007.
EP Office Action (Mar. 28, 2007) from EP Patent Application No. 03746053.2-2416.
EP Office Action (Apr. 5, 2006) from EP Patent Application No. 03739 127.3-2416.
EP Search Report (Feb. 10, 2006) from EP Patent Application No. 03746053.2-2416.
EP Office Action dated Oct. 1, 2007 from related EP Application No. 03746053.2-2416.
EP Search Report (May 19, 2005) from EP Patent Application No. 03746062.3-1249.
AU Office Action (Mar. 16, 2007) from AU Patent Application No. 2002364204.
AU Office Action (May 23, 2007) from AU Patent Application No. 2003226093.
Australian Office Action dated Oct. 4, 2007 from related Australian Application No. 2003245492.
AU Office Action dated May 30, 2007 from AU Patent Application No. 2003226022.
CA Office Action 2,487,071, dated Jun. 15, 2006.
China Office Action issued Dec. 1, 2006 from related China Application No. 02828262.0.
China Office Action dated Mar. 7, 2008 from related China Application No. 03807560.1.
CN Office Action (Sep. 8, 2006) from CN Patent Application No. 03807600.4.
China Office Action dated Jun. 22, 2007 from related China Application No. 03813264.8.
China Office Action dated Mar. 7, 2008 from related China Application No. 03807560.1.
CN Office Action 200480010826.0, dated Oct. 19, 2007.
Japanese Application No. 2003-559086, Office Action dated May 19, 2008.
Japanese Application No. 2003-582973, Office Action dated Jun. 2, 2008.
Guan et al., Inter-fabric FC Architecture, May 30, 2003, Brocade—The Intelligent Platform for Network Storage.
Mearian et al., "What's After Fibre Channel?", Computerworld, Online!, Oct. 15, 2001, XP002246206.
Monia et al., "iFCP—A Protocol for Internet Fibre Channel Storage Networking" Feb. 2002.
Office Action dated May 2, 2008 for Japanese Patent Application No. 2003-582964.
D1: Yasumori Takizawa, "Technology Scope IP Storage Disk Divided by IP Network Wide Area Ethernet Encouraging the Same," *Nikkei Communication*, Mar. 4, 200, No. 361, pp. 106-113.
D2: Glenn Sullivan, "Building of Long Distance SAN", *UNIX Magazine*, Apr. 1, 2000, vol. 15, No. 4, pp. 133-137.
D4: Fujita et al., "SSE98-225 QoS Control Using MPLS over ATM," *Technical Report of IEICE*, Mar. 19, 1999, vol. 98, No. 668, pp. 81-86.
Examination Report dated Jul. 14, 2008 from Australian Patent Application No. 2003296301.
U.S. Appl. No. 10/114,394, Final Office Action mailed Aug. 21, 2008.
Notice of Allowance for U.S. Appl. No. 10/430,491 dated Aug. 8, 2008.
Supplemental Notice of Allowance for U.S. Appl. No. 10/430,491 dated Aug. 26, 2008.
Allowed Claims for U.S. Appl. No. 10/430,491.
U.S. Appl. No. 11/027,252, Final Office Action mailed Aug. 7, 2008.
CN Office Action 200580034140.X dated Jun. 6, 2008.
U.S. Appl. No. 10/974,368, Office Action dated Sep. 12, 2008.
U.S. Appl. No. 11/027,252, Office Action mailed Dec. 12, 2008.
Canadian Office Action dated Aug. 13, 2008 from related CA Application No. 2,472,056, 2 pgs.
Office Action issued on Sep. 5, 2008 for CN Patent Application No. 200380104466.6.
U.S. Office Action dated Nov. 19, 2008 from U.S. Appl. No. 10/034,160.
Office Action issued on Dec. 26, 2008 for CN Patent Application No. 03807560.1.
USPTO Notice of Allowance U.S. Appl. No. 10/609,442, mailed Sep. 26, 2008.
Office Action issued on Aug. 13, 2008 for Canadian Patent Application No. 2,480,462.
U.S. Appl. No. 10/974,368, Notice of Allowance dated Feb. 13, 2009.
Office Action mailed for U.S. Appl. No. 10/114,394, Mar. 23, 2009.
Japanese Application No. 2003-582973, Office Action dated Dec. 22, 2008.
Office Action issued on Jun. 22, 2007 for Chinese Patent Application No. 03813264.8.
U.S. Appl. No. 12/343,843, filed Dec. 24, 2008.
Office Action issued on Jan. 30, 2008 for Canadian Patent Application No. 2,480,461.
Office Action for CN Patent Application No. 200480010826.0, dated Nov. 7, 2008.
Office Action for AU Patent Application No. 20043000650, dated Sep. 26, 2008.
Office Action for CA Patent Application No. 2,521,463 dated Sep. 24, 2008.
EP Office Action dated May 30, 2006 from related EP Application No. 02799279.1-1525.
Office Action issued on Jan. 30, 2008 for Canadian Patent Application No. 2,480,461.
Office Action for CN Patent Application No. 200480010826.0, dated Nov. 7, 2008.
Office Action for AU Patent Application No. 20043000650, dated Sep. 26, 2008.
Notification of Provisional Rejection issued on Apr. 15, 2009 for KR Patent Application No. 2004-7010143.
Second Office Action issued on Apr. 28, 2009 for Canadian Patent Application No. 2,472,056.
Second Office Action issued on Apr. 24, 2009 for Chinese Patent Application No. 200380104466.6.
Chinese Office Action, Chinese Patent Application No. 03807600.4, Issued May 8, 2009.
U.S. Appl. No. 10/974,368, Notice of Allowance dated Apr. 21, 2009.
Notice of Allowance dated May 29, 2009 from U.S. Appl. No. 10/034,160.
Notice of Allowance dated Jun. 25, 2009 from U.S. Appl. No. 10/114,394.
Notice of Allowance dated Jun. 26, 2009 from U.S. Appl. No. 11/027,252.
U.S Office Action mailed Aug. 18, 2009 in U.S. Appl. No. 12/202,004.
Japanese Office Action issued on May 25, 2009 for Patent Application No. 2003-582964.
Canadian Office Action mailed Jun. 17, 2009 in Application No. 2,472,056.
CN Third Office Action dated Nov. 20, 2009 for Application No. 200380104466.6.
JP Office Action mailed Jul. 27, 2009 for Japanese Application No. 2003-582973, Office Action.
U.S. Allowed Claims (Jun. 25, 2009) from related U.S. Appl. No. 10/114,394.
U.S. Office Action dated Feb. 17, 2010 from related U.S. Appl. No. 12/202,004.
U.S. Allowed Claims (Apr. 21, 2009) from related U.S. Appl. No. 10/974,368.
U.S. Allowed claims (Jun. 26, 2009) from related U.S. Appl. No. 11/027,252.
U.S. Notice of Allowance mailed Nov. 9, 2009 from related U.S. Appl. No. 11/027,252.

M. Rajagopal, R. et al., "Fibre Channel Over TCP/IP" DRAFT-IETF-IPS-FCOVERTCPIP-06.TXT, Mar. 1, 2002, pp. 1-46, XP015021184.

Monia, et al., "iFCP - A Protocol for Internet Fibre Channel Storage", DRAFT-MONIA-IPS-IFCP-01.txt, Jan. 1, 2001, pp. 1-48, XP01502633.

CA Third Office Action dated Apr. 30, 2010 for Canadian Application No. 2,521,463.

EP Office Action dated Feb. 9, 2010 from related EP Application No. 03 746062.3-1249.

U.S. Non-Final Office Action dated Oct. 1, 2010, from related U.S. Appl. No. 12/566,013.

U.S. Notice of Allowance issued Jul. 7, 2010 from related U.S. Appl. No. 11/713,341.

U.S. Office Action dated Apr. 28, 2010, from related U.S. Appl. No. 12/343,843.

Notice of Allowance dated Sep. 20, 2010, from related U.S. Appl. No. 12/343,843.

* cited by examiner

| Case | TN_port virtual HBA support | Switchport EPP support | TN_port trunk mode | Switchport trunk mode | Traffic frame format | TN_port model interfaces |
|---|---|---|---|---|---|---|
| i | Disabled | Don't care | Don't care | Don't care | Untagged | The physical HBA interface carry all traffic in untagged format. The virtual HBAs and the HBA controller N_port are not used. |
| ii | Enabled | Disabled or not supported | Don't care | Don't care | Untagged | As in case (i) above. |
| iv | Enabled | Enabled | ON/Auto | OFF | Untagged | The virtual HBA interface for the port VSAN of the attached F_port is used along with the HBA controller N_port. The link is operational in non-trunking mode, and all traffic is exchanged in untagged format, assumed to be in the port VSAN of the attached F_port. The physical HBA interface is not used. |
| v | Enabled | Enabled | ON/Auto | ON | Tagged | The virtual HBA interfaces (one for each operational VSNA) are used along with the HBA controller N_port. The link is operational in trunking mode, and all traffic is exchanged in EISL format. The physical HBA interface is not used. |

FIG. 4

TRUNKING FOR FABRIC PORTS IN FIBRE CHANNEL SWITCHES AND ATTACHED DEVICES

CROSS REFERENCE TO RELATED APPLICATIONS

This application is related to U.S. patent application Ser. No. 10/430,491, (U.S. Publication No. US-2004-0100910-A1, published May 27, 2004), filed May 5, 2003 and titled METHODS AND DEVICES FOR EXCHANGING PEER PARAMETERS BETWEEN NETWORK DEVICES, by Desai et al., which is incorporated herein by reference for all purposes. This application is also related to U.S. patent application Ser. No. 10/034,160, (U.S. Publication No. US-2003-0118053-A1, published Jun. 26, 2003), filed Dec. 26, 2001, titled METHODS AND APPARATUS FOR ENCAPSULATING A FRAME FOR TRANSMISSION IN A STORAGE AREA NETWORK, by Gai et al., which is incorporated herein by reference for all purposes.

FIELD OF INVENTION

This invention pertains to Fibre Channel networks and the devices and methods implemented therein. More specifically, the invention pertains to devices and methods for extending trunking functionality to fabric ports on switches and attached devices.

BACKGROUND

In recent years, the capacity of storage devices has not increased as fast as the demand for storage. Therefore a given server or other host must access multiple, physically distinct storage nodes (typically disks). In order to solve these storage limitations, the Storage Area Network ("SAN") was developed. Generally, a storage area network is a high-speed special-purpose network that interconnects different data storage devices and associated data hosts on behalf of a larger network of users. A SAN may use various types of network traffic, but more often than not it employs Fibre Channel frames.

Traditionally, designers of storage area networks built separate fabrics, otherwise known as SAN islands. For example, a business might employ one SAN island for human resources applications, another SAN island for engineering applications, another for marketing, etc. Each SAN island contains a physically isolated switch or a group of switches for connecting hosts to storage devices. While this approach may enforce separation of data between various groups in an organization, it frequently under utilizes hardware and management resources.

More recently, some switches such as the MDS9000 family of switches from Cisco Systems, Inc. of San Jose, Calif. have provided the capability to deploy virtual SANs ("VSANs"). With this approach, a multiple SAN islands may be collapsed to a single physical infrastructure, thereby reducing hardware costs and improving manageability while maintaining the stability and traffic isolation of the SAN island model. Each VSAN is logically separate and may be assigned to a separate group, e.g., marketing, engineering, etc. In this collapsed fabric model, some or all switches and inter-switch links in the fabric carry traffic for multiple VSANs.

Until now, only the interconnect ports (called "E_Ports") that connect the VSAN switches could be configured to carry the traffic of multiple VSANs. Therefore, host bus adaptors ("HBAs") or other interfaces in hosts or disks attached to F_Ports or FL_Ports could be configured in one VSAN only. The VSAN of the attached switch port (also called the "port VSAN") is implicitly assigned to the HBA and all traffic transmitted or received by the HBA belongs to that VSAN. In this approach, all traffic between the HBA and the switch port is transmitted in standard Fibre Channel frame format, commonly termed "untagged format." This should be contrasted with the format of frames exchanged between trunking E_Ports, which are encapsulated in Extended Inter-Switch Link ("EISL") format, commonly termed "tagged format". The format specifically identifies the VSAN of each frame and thereby allows enforcement of VSAN specific security policies, quality of service, etc. The use of trunking E_Ports and the EISL format is described in detail in US Patent Publication No. US-2003-0118053-A1, previously incorporated by reference.

Today, Fibre Channel VSAN implementations require that node devices employ multiple HBAs to connect to multiple switchports—one for each supported VSAN—to achieve multi-homing (participation in multiple VSANs). This redundancy is wasteful. So while the deployment of multiple VSANs on a common topology represents a significant advance in storage area network technology, the requirement that a node have a separate physical interface for each of its VSANs presents a significant waste of resources. Therefore, an improved protocol and apparatus design to provide more efficient use of N_Port and F_Port resources is needed.

SUMMARY

The present invention addresses this need by providing new logic for node ports and fabric ports. The logic allows designation of multiple virtual interfaces on a single host bus adaptor or other Fibre Channel interface, with one virtual interface for each VSAN available on the node interface. Node ports with this additional functionality are referred to as trunking N_Ports or TN_Ports. These ports have a functional design allowing creation of the multiple virtual interfaces as appropriate for the application at hand. This port design also includes logic for communicating with a peer fabric port to initialize and modify the configuration of the virtual interfaces on the TN_Port. The invention further provides a corresponding functional design and communication logic in fabric ports, referred to herein as trunking F_Ports or TF_Ports.

One aspect of the invention provides a Fibre Channel switch port or node port that controls trunking over a Fibre Channel link coupling a node to a fabric switch. The port includes a controller for managing trunking on the port by communicating with a peer port over the Fibre Channel link. Through the communication, the port can determine whether virtual SAN functionality is available and if so define one or more virtual SAN interfaces, with each virtual SAN interface providing the functionality of a single virtual SAN. For determining whether virtual SAN functionality is available, the controller is designed or configured to negotiate a mode of operation with the peer, with the available modes of operation include trunking and non-trunking over the Fibre Channel link. For defining one or more virtual SAN interfaces, the controller is designed or configured to identify VSANs common to the switch port and the node port. In a specific embodiment, the communication for managing trunking takes place using an Exchange Peer Parameter (EPP) protocol. The port may be implemented in hardware, software, or a combination of the two.

Another aspect of the invention provides trunking N_Port for a Fibre Channel node. The trunking N_Port may be characterized by the following features: (a) a physical N_Port interface designed or configured to provide functionality of a non-trunking N_Port when virtual SAN functionality is not available; and (b) a controller for managing trunking on the trunking N_Port.

Similar to the controller described for the first aspect of the invention, the controller in this aspect is designed or configured to communicate with an F_Port on a Fibre Channel switch and determine whether virtual SAN functionality is available and if so define one or more virtual SAN interfaces on the trunking N_Port, with each virtual SAN interface providing the functionality of an N_Port for a single virtual SAN. Typically, the physical N_Port functionality provides no information regarding virtual SANs in frames transmitted therefrom. In contrast, the one or more of the virtual SAN interfaces are designed or configured to provide frames containing information identifying the particular virtual SAN to which it belongs. Such information may be provided in an EISL header for the frames. Such frames may also specify QoS parameters, MPLS features, etc. available for the virtual SANs. The controller has a Fibre Channel well known address but is typically designed such that it does not take part in data traffic.

A further aspect of the invention pertains to methods of establishing a link between a trunking N_Port on a node and an F_Port on a Fibre Channel switch. Such methods may be characterized by the following sequence: (a) determining whether virtual SAN functionality exists on the F_Port; and (b) defining one or more virtual SAN interfaces on the trunking N_Port, with each virtual SAN interface providing the functionality of an N_Port for a single virtual SAN. Preferably, both (a) and (b) are both implemented by communicating between the trunking N_Port on a node and the F_Port. Such communication may be accomplished using the EPP protocol, for example.

Another aspect of the invention pertains to storage networks including multiple nodes having trunking N_Ports and a fabric comprised of switches having F_Ports linked to the trunking N_Ports. The trunking N_Ports comprise controllers designed or configured to communicate with F_Ports on a Fibre Channel switch and determine whether virtual SAN functionality is available and if so define one or more virtual SAN interfaces on their trunking N_Ports, with each virtual SAN interface providing the functionality of an N_Port for a single virtual SAN.

Still another aspect of the invention pertains to computer program products including machine-readable media on which are stored program instructions for implementing at least some portion of the methods described above. Any of the methods of this invention may be directed, in whole or in part, by executing program instructions provided on such computer readable media. In addition, the invention pertains to various combinations of data and data structures generated and/or used as described herein.

These and other features and advantages of the present invention will be described in more detail below with reference to the associated figures.

BRIEF DESCRIPTION OF THE DRAWINGS

FIG. 4 is a table showing how different configurations of the F_Port and TN_Port may result in different modes of operation on a shared link.

DETAILED DESCRIPTION

Introduction

As indicated, many embodiments of this invention pertain to trunking. Trunking allows a single port and associated link to carry traffic for multiple different virtual groups of network devices (e.g., multiple VSANs). Thus, a single physical infrastructure can support these separate groups, each of which may require its own security policy, quality of service parameters (QoS), communications protocols, etc. And, as explained in US Patent Publication No. US-2003-0118053-A1, VSANs may also be designed to support MPLS in Fibre Channel infrastructures.

In the Fibre Channel standard, multiple types of ports are defined. These include N_Ports, F_Ports, and E_Ports. N_Ports reside network end nodes such as hosts and disks. F_Ports reside on fabric switches and connect to N_Ports to provide links between nodes and fabric switches. E_Ports are used for links between fabric switches, inter-switch links (ISLs). To date only E_Ports have been designed to carry traffic for multiple VSANs.

The present invention allows for an improved SAN design in which the HBAs or other node interfaces can be configured in multiple VSANs. In this manner, multi-homing is achieved even while attaching a single N_Port to a single F_Port. This improves the utilization factor of bandwidth in HBAs (and the attached switch ports), reducing the overall port count requirement in the SAN, and hence, reducing the overall Total Cost of Ownership (TCO). One example application for trunking with HBAs is the tape backup application where instead of having one HBA for each VSAN to be backed up, one HBA may be used for backup of multiple VSANs.

Figure 1A:
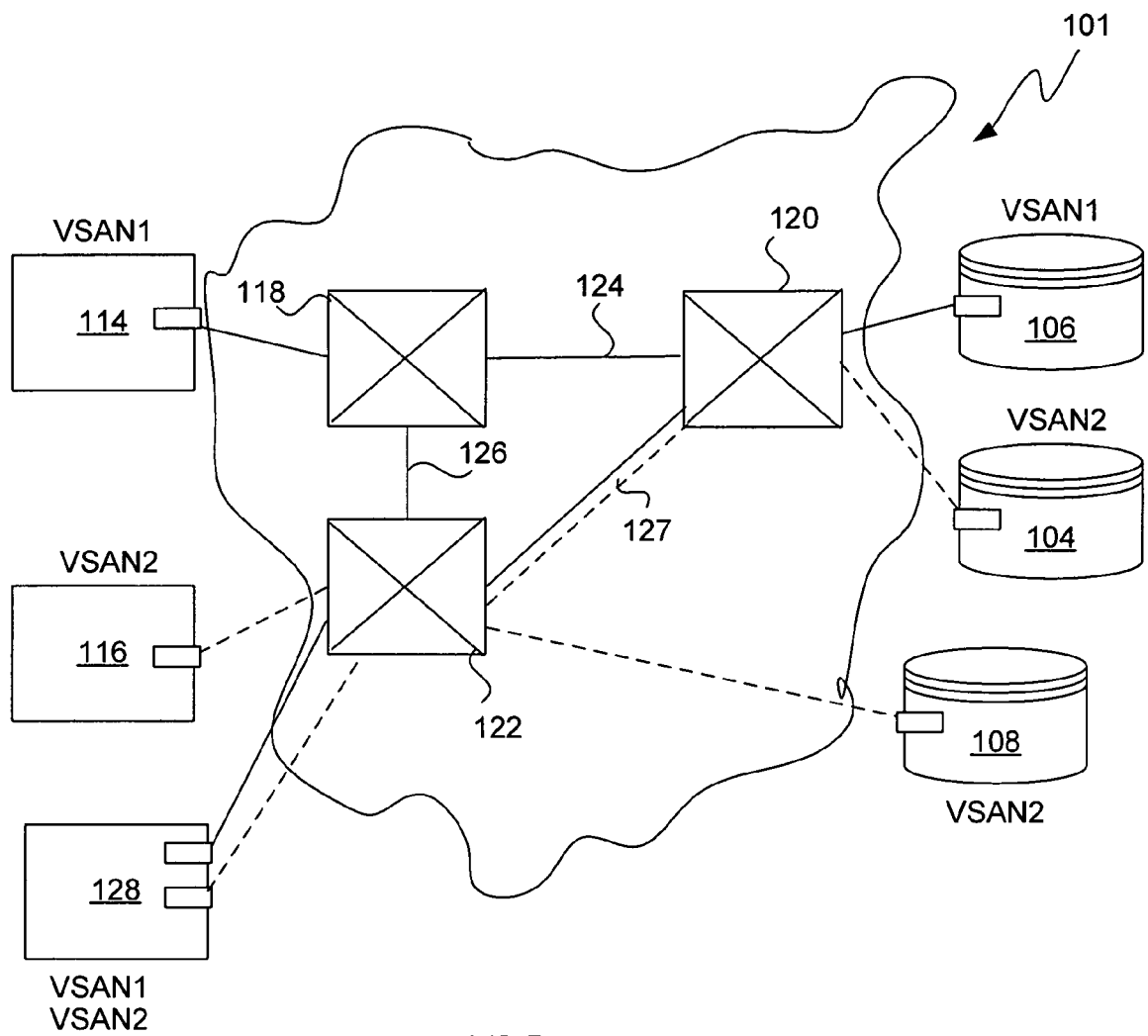
FIG. 1A is a diagram of a simple storage area network including a storage area network fabric and associated end nodes, which belong to two different VSANs.

FIG. 1A depicts a simple storage area network including a storage area network fabric 101 and associated end nodes. These nodes include hosts 114, 116, and 128, as well as storage disks 104, 106, and 108. The hosts may be servers or other computers requiring access to the data on the disks.

Fabric 101 is comprised of switches 118, 120, and 122 coupled by inter-switch links 124, 127, and 126. These switches run a storage area network protocol such as Fibre Channel, which provides communication between the nodes via Fibre Channel frames.

As indicated above, a single infrastructure such as fabric 101 can support multiple VSANs, each associated with a distinct group of nodes. In the example of FIG. 1A, two VSANs are implemented on the storage area network, VSAN1 and VSAN2. The nodes belonging to VSAN1 are hosts 114 and 128 and disk 106. All three switches have dedicated ports that support traffic on VSAN1. The nodes belonging to VSAN2 are hosts 116 and 128, as well as disks 104 and 108. Only switches 120 and 122 allow traffic on both VSAN1 and VSAN2. Switch 118 is dedicated to traffic on VSAN1. Note that links carrying traffic on VSAN1 are indicated by solid lines while links carrying traffic on VSAN2 are indicated by dashed lines.

Each link has an associated port. Inter-switch links employ Fibre Channel E_Ports. Fabric ports (F_Ports) are ports on switches that communicate over links with node ports (N_Ports). To date, the ability to carry traffic for multiple VSANs over a single link has been reserved for inter-switch links supporting EISL, as mentioned above. In some contexts, such E_Ports are referred to trunking E_Ports or "TE_Ports." It is important to note that in current technology, as depicted in FIG. 1A, trunking is limited to inter-switch links. Links between N_Ports and F_Ports are necessarily non-trunking. As indicated, this presents a burden if a particular node needs to communicate on multiple VSANs. For example, as depicted in FIG. 1A, node 128 belongs to both VSAN1 and VSAN2. To allow for this, hosts 128 must include separate ports (network interfaces such as HBAs) for each VSAN. Similarly, each switch must provide a separate F_Port for each VSAN over which it and its associated node will communicate. This situation is depicted in switch 122 of fabric 101.

Figure 1B:
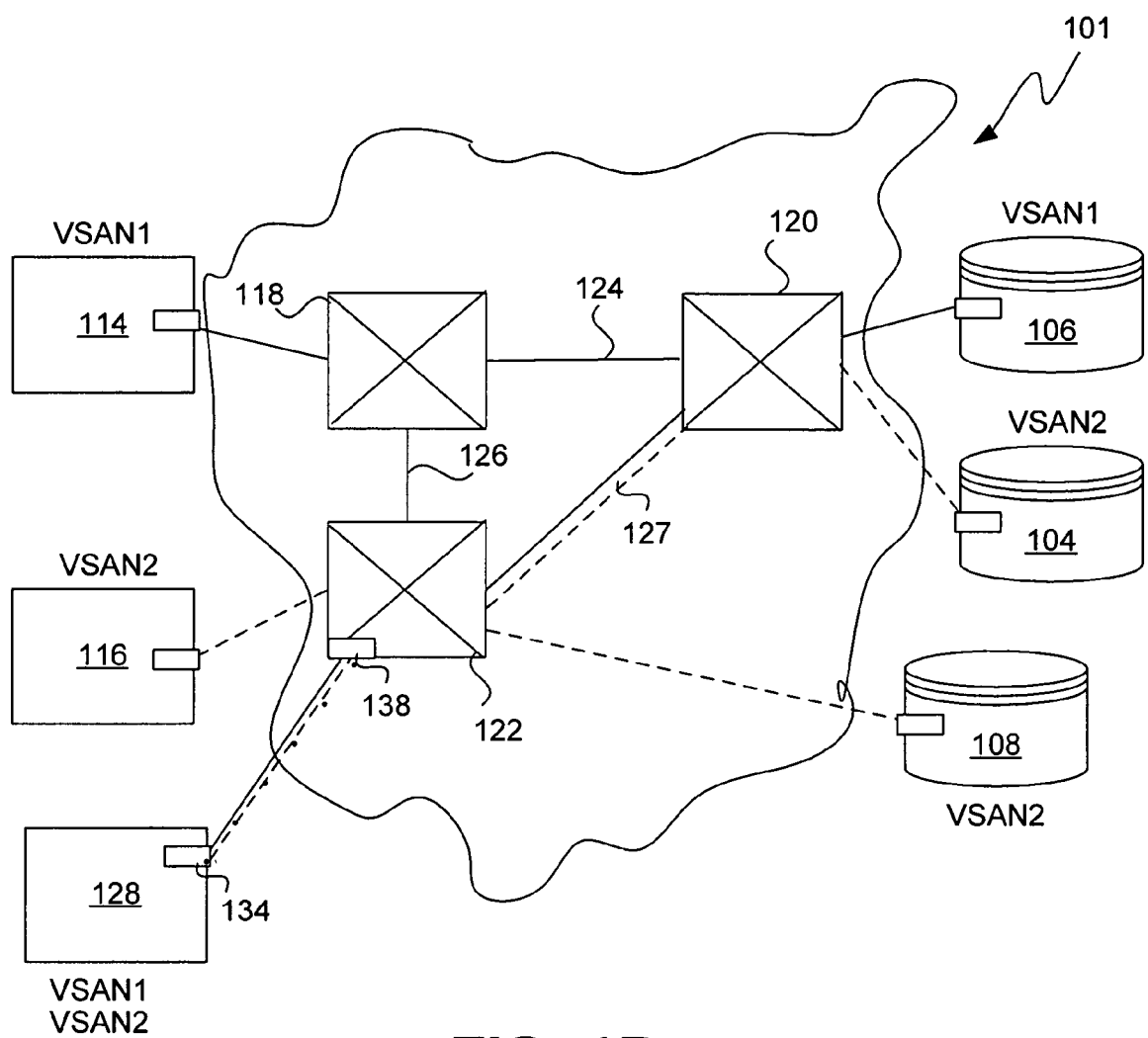
FIG. 1B is a diagram of a simple storage area network including a storage area network fabric and associated end nodes employing trunking N_Ports, which support traffic for two different VSANs.

To remedy this problem, the present invention provides trunking N_Ports (TN_Ports) and trunking F_Ports (TF_Ports). These allow a single HBA or other node interface to communicate with a single F_Port and provide edge traffic for two separate VSANs over a single link. This is shown in FIG. 1B where host 128, which belongs to both VSAN1 and VSAN2, contains a single HBA 134 connected to switch 122 via a link 136. This link is coupled to a trunking F_Port 138 on switch 122. As shown, link 136 carries traffic for both VSAN1 and VSAN2, and is thus deemed a trunking link. The principal difference between the networks depicted in FIGS. 1A and 1B is in the use of a single HBA 134 and a single F_Port 138 for communications between node 128 and switch 122, which communications may include traffic on both VSAN1 and VSAN2.

Various techniques for implementing multi-homing in node ports and fabric ports are within the scope of this invention. Some will be described the following sections. Typically, a TN_Port will include some control logic that can set up and initialize multiple virtual interfaces in a single node port. The control logic will need to communicate with corresponding logic on a trunking fabric port to negotiate and identify supported VSANs on the common link. The control logic may also communicate and negotiate to the extent needed state changes in existing trunk links. Such changes may include conversion from trunking to non-trunking, change in the list of supported or available VSANs, changes from non-trunking to trunking, etc.

In a specific embodiment, the control logic initially determines whether its peer fabric port supports or currently permits establishment of VSANs and/or trunking. It may use a conventional node login procedure for this purpose, e.g., FLOGI in the case of Fibre Channel. If it is determined that the fabric port cannot or currently does not support trunking, then it may configure the TN_Port to act as a conventional N_Port which does not explicitly recognize VSANs. If the control logic does find that its peer F_Port supports and permits trunking, it may then negotiate with the F_Port to determine which VSANs will be supported in the trunking link.

In this embodiment, the fabric port will similarly contain control logic for confirming that it supports trunking and for negotiating appropriate parameters (list of supported VSANs for the link, etc.) with the TN_Port. Appropriate functional designs for the TN_Port and TF_Port will be described below.

Functional Design of a TN_Port

As indicated, a Fibre Channel node device (e.g., a host bus adaptor) that supports trunking is termed a Trunking N port (TN_Port) herein. Such a device when attached to a switch-port in TF_Port mode can transmit and receive frames in one or more VSANs over the same physical link. In one embodiment, this is accomplished when using the EISL frame format.

Figure 2:
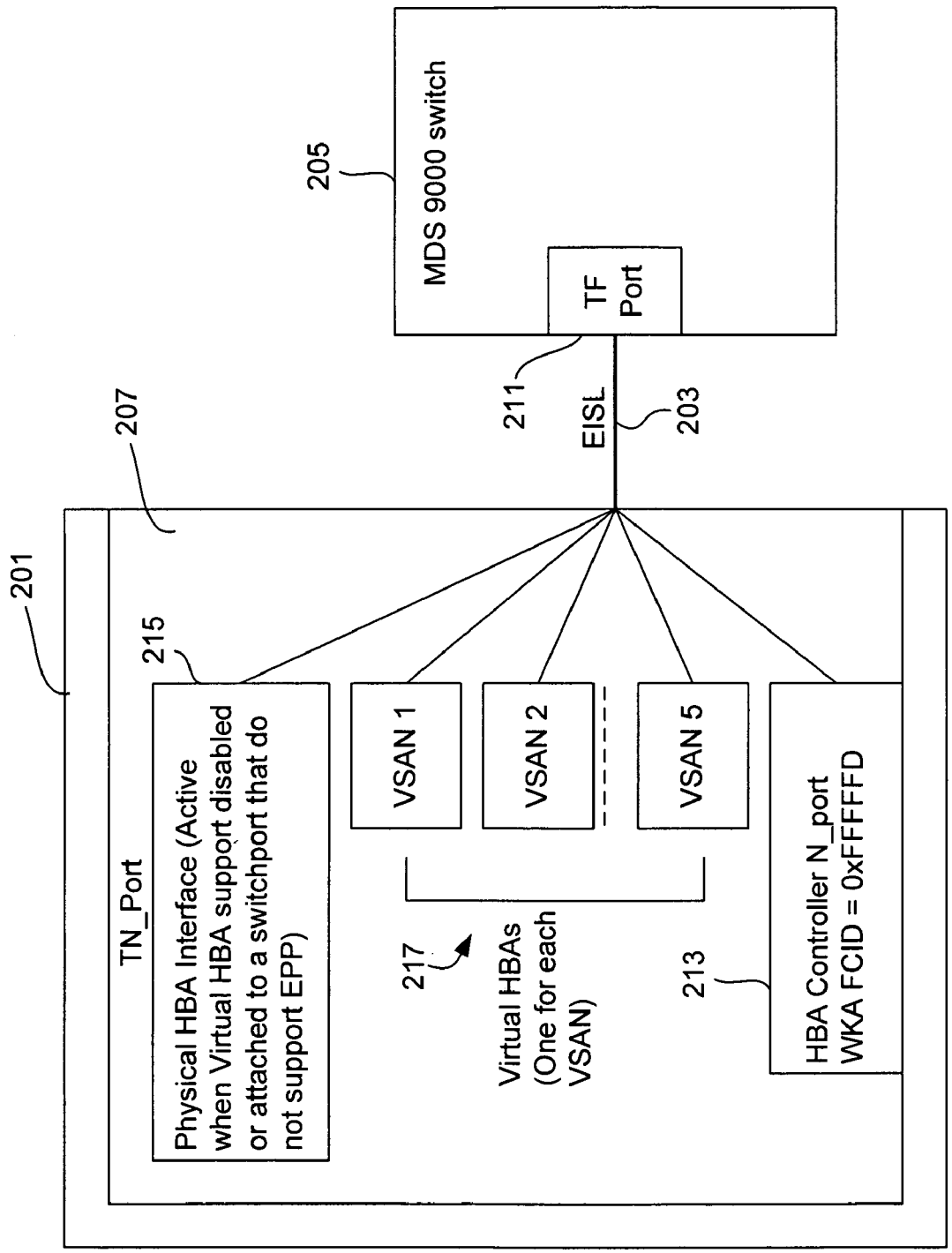
FIG. 2 is a block diagram showing various functional components of trunking N_Port in accordance with an embodiment of this invention.

One example of a TN_Port model is shown in FIG. 2. As shown there, a fabric switch 205 is coupled to a node 201 by a Fibre Channel link 203. Data transmission and management of the link is provided by a fabric port 211 in switch 205 and a node port 207 in node 201. These are configured as trunking ports having functionality described herein.

In the depicted model, TN_Port 207 includes three types of logical entities: an HBA Controller N_Port 213, a Physical HBA interface 215, and one or more virtual HBA interfaces (one for each VSAN configured) 217. Each of these logical entities exchanges frames over the same physical link 203 attached to the TN_Port. The physical link 203 can receive frames specifying a VSAN or other virtual fabric (in for example EISL format). The TN_Port 207 can operate in various modes as explained below. Even if it is in a mode that does not support trunking, it can implicitly support a single VSAN, as with current technology.

The HBA Controller N_Port 213 is a logical entity that is responsible for communicating with attached TF_Port 211 for configuration and management of trunking feature on TN_Port 207. It may accomplish this using any appropriate communication protocol. In a specific example detailed below, the configuration and management communications take the form of Fibre Channel exchanges using the Exchange Peer Parameter (EPP) protocol. During these communications, the entity may behave like an N_Port with a well-known address, but it does not take part in data traffic. Thus, the HBA Controller N_Port 213 may be given a well-known address (WKA), e.g., the value hex FFFFFD. It may also be given a unique VSAN tag or ID (e.g., 4094) to use during these configuration and management communications.

A virtual HBA interface 217 is a logical entity of the TN_Port that mimics the functionality of a physical N_Port attached to an F_Port, but exchanges traffic in one VSAN only. Configuration exchanges, as described below, are established to specify the number and identities of virtual HBA interfaces 217. The VSAN IDs are assigned by the controller 213 to individual virtual HBA interfaces based upon parameter values established during set up with the TF_Port 211. A WWN is assigned by node device 201.

Typically, each TN_Port has the ability to instantiate one or more such virtual HBAs, one for each configured VSAN. Three virtual HBA interfaces 217 are shown in TN_Port 207. Each has the ability to apply its own VSAN tag to outgoing frames. Each also has the ability to process incoming frames sorted to it based on VSAN tag. Applications running on node 201 communicate with individual ones of the virtual HBA interfaces 217 based on their participation in the various supported VSANs. In some embodiments presented herein, the virtual HBA interfaces 217, each perform FLOGI in the manner of a conventional N_Port and take part in data traffic in the configured VSAN.

All frames transmitted and received by the virtual HBAs 217 are carried over the same physical link 203 between the TN_Port 207 and the attached F_Port 211. If link 203 is operational in trunking, all frames are tagged in EISL format (or other VSAN aware format); otherwise, all frames are untagged.

The Physical HBA Interface 215 is an optional logical entity that mimics the functionality of a physical N_Port attached to an F_Port but is not VSAN aware. It comes into play when either virtual HBA support of the TN_Port is disabled or the attached F_Port does not support VSANs, as well as a communication protocol for configuring VSANs on N_Port 207. This interface is not used when any of the virtual HBAs 217 are instantiated and active. Most commonly, this interface is used when the TN_Port is attached to a switch that is not VSAN aware or when the applications running on node 201 do not support virtual HBA interfaces.

When activated, Physical HBA Interface 215 exchanges all traffic originating with and received by TN_port 207. All such traffic is untagged. In all other aspects, data transfer on interface 215 resembles that on conventional HBAs, which have no knowledge of VSANs. For Physical Interface 215, a VSAN ID may be implicitly assigned by the F_Port, and a WWN is assigned by node device 201.

In some implementations, Physical HBA interface 215 may be unnecessary. One such implementation could, for example, employ at least one instance of block 217 and this could also perform the function of the Physical HBA when needed. Similarly, the HBA controller block 213 is also shown as one possible way to implement the functionality required. It may not be required in alternate implementations.

Functional Design of TF_Port

The logical design of a TF_Port is generally similar to that of the TN_Port and mirrors its functionality in many ways. It supports multiple VSANs and may be viewed as creating a virtual interface for each separate VSAN, in the manner depicted for the TN_Port in FIG. 2. Each virtual interface may have the ability to apply a VSAN label to outgoing frames. And incoming VSAN frames are sorted to the individual virtual interfaces for separate handling. Generally, however, the F_Port virtual interfaces need not have the ability to handle FLOGI frames or provide as much support to higher level applications as is provided by the virtual HBA interfaces in TN_Ports, at least in some implementations.

In one embodiment detailed below, an F_Port becomes operational in TF_Port mode, if the attached Fibre Channel node supports EPP services and the trunk mode configuration at both ends of the link allows trunking.

Configuration and Initialization

Various methods and functional designs may be employed to configure linked N_Ports and F_Ports for trunking. In some embodiments, a three-phase procedure is employed. First, the N_Port determines whether the F_Port can communicate via a protocol intended to allow configuration. Assuming that the N_Port confirms this, the ports then use such protocol to negotiate parameter values needed to configure their link. Examples of such parameters include mode of operation for the ports (trunking versus non-trunking), number of VSANs supported, and identification of VSANs supported. Finally, after the negotiation is complete and the link VSANs are identified (if any), each individual virtual HBA interface separately logs into the fabric (for its particular VSAN). Any other pre-login protocols, as applicable shall be performed before the logins performed by individual virtual HBA interfaces.

Figure 3:
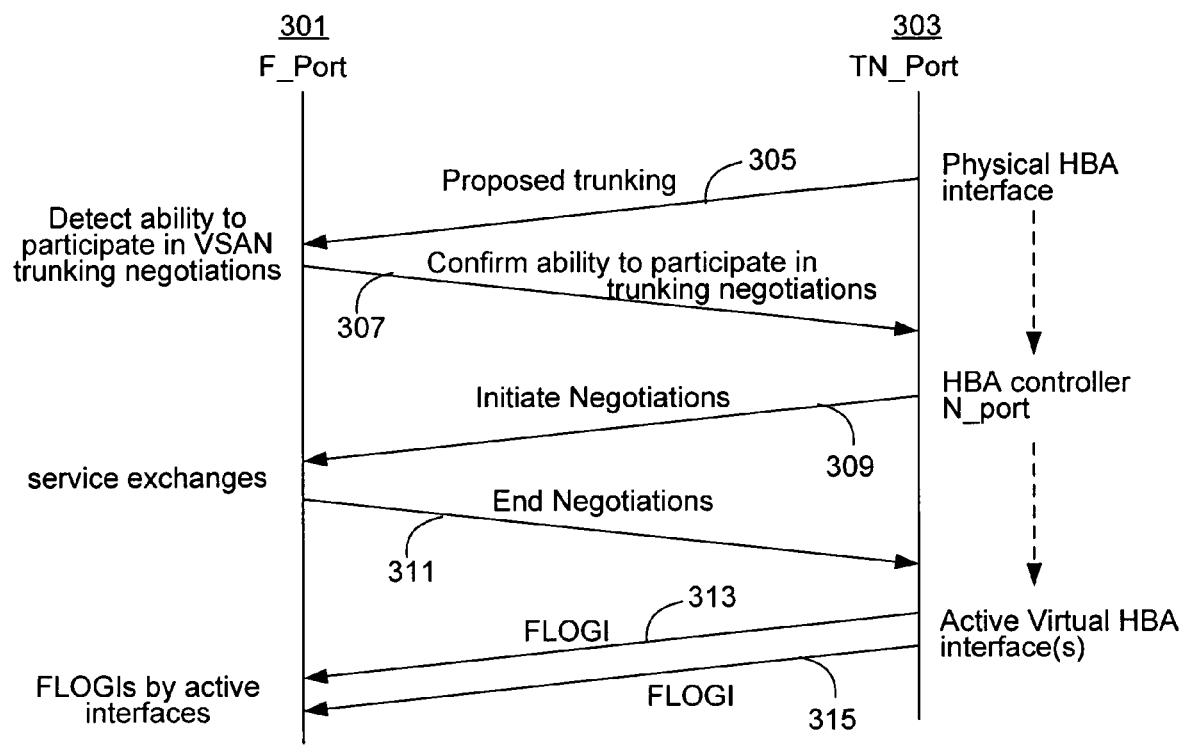
FIG. 3 is an interaction diagram depicting, at a relatively high level, some interactions between a trunking F_Port and a trunking N_Port in setting up a trunking link that supports multiple VSANs, in accordance with an embodiment of this invention.

This basic procedure is illustrated in FIG. 3, where interactions between an F_Port 301 and a TN_Port 303 are depicted as diagonal lines. The process begins with TN_Port 303 sending a frame 305 to F_Port 303 proposing trunking (or at least some form of communication under a defined protocol for configuring trunking). The F_Port then recognizes that it is being asked to communicate in the protocol and responds with a frame 307 confirming that it can and will communicate in such protocol. When TN_Port 303 receives this message, it prepares to enter the second phase of the setup. Note that if the TN_Port has a functional design as illustrated in FIG. 2, the logic to send frame 305 and interpret frame 307 may reside with the Physical HBA Interface 215. No VSAN support has yet been confirmed, so communication via a conventional HBA is appropriate.

After port 303 enters the second phase of set up, HBA controller N_Port 213 takes over (again assuming the functional design of FIG. 2). Depending upon the particular protocol employed, a series of communications may be required to fully negotiate the parameter set going forward. In FIG. 3, two communications are intended to represent the entire negotiation phase of setup. These are a message 309 from the TN_Port to initiate negotiation and a message 311 from F_Port 301 to conclude negotiation. In a specific embodiment described below, the negotiation takes place in an EPP protocol.

At the end of the negotiation protocol, there may be one or more virtual HBA interfaces defined on TN_Port 303. As indicated in FIG. 3, each of these (two in this example), initiate a separate fabric login for its specific VSAN. This is indicated by FLOGI messages 313 and 315 from the TN_Port 303. As shown, the active virtual HBA interfaces (217 from FIG. 2) send the FLOGI messages. Corresponding logic in F_Port 301 provides the fabric side of the login for each virtual HBA interface.

Before describing the initial phase of this process in more detail, various TN_Port modes of operation will be described, in accordance with a preferred embodiment of this invention. The particular mode of operation is governed by the current states of the node and fabric ports. For example, the switchport state may or may not support the chosen communication protocol for negotiating VSAN services on the link (e.g., EPP). Further, the current trunking configurations may be different at the two ends. Thus, the particular mode adopted at any time is determined in large measure by the current configuration of the fabric switchport. The TN_Port itself may be configured to enable or disable virtual VSAN support based on the applications supported by the HBA. If, for example, the supported and active applications do not require VSAN differentiation, then it may be appropriate to disable virtual VSAN support.

FIG. 4 depicts the various modes of operation in accordance the described embodiment. As shown, the port settings and capabilities specify modes of operation as follows:

i) When virtual HBA support is disabled in the TN_Port, its trunking capability is necessarily disabled, and the physical HBA interface is used for all traffic; the HBA contoller N_Port and the virtual HBA interfaces are not used. The TN_Port is thus configured if, for example, (a) the applications supported do not require operation in multiple VSANs or cannot make use VSAN specific features such as QoS or (b) the TN_Port is intended to be attached to a switch that does not support trunking.

ii) When virtual HBA support is enabled for a TN_Port, the node applications are expected to work with one or more of the virtual HBA interfaces, and the TN_Port is expected to be attached to a switch that can support trunking. However, if the TN_Port is thus configured but attached to a switch that does not support the defined negotiation protocol or has such support disabled, the TN_Port will behave like a normal N_Port, as mentioned above, and the physical HBA interface will be used.

iii) When the virtual HBA support is enabled for the TN_Port and it is attached to a fabric port with negotiation protocol support enabled, the operational trunk mode of the link is determined during negotiation of services, and it depends on the trunk mode configuration at both endpoints (discussed later). In this case, the physical HBA interface is not used irrespective of the operational trunk mode of the link.

iv) For case (iii) above, if the link is operational in non-trunking mode, only one virtual HBA interface (identified by the port VSAN of the attached F_Port, communicated to the TN_Port through negotiation services) is used along with the HBA Controller N_Port. All traffic is untagged in such configuration, and assumed to be in the port VSAN of the attached F_Port.

v) For case (iii) above, if the link is operational in trunking mode, one or more virtual HBA interfaces (one for each operational VSAN determined during the negotiation) are used along with the HBA Controller N_Port. All traffic is exchanged in tagged format, and the VSAN information is embedded in the VSAN header.

In case (iv) above, the virtual HBA interface for the port VSAN of the attached port is used instead of the physical HBA interface to ensure smooth transition from non-trunking to trunking mode of the link.

Configuration Protocol Detection

As indicated, to setup a TN_Port of this invention, the node and fabric ports must first agree on a set of parameters for their link. To accomplish this, they must employ a common protocol for the setup. Thus, as an initial matter, the ports must determine that their peer is prepared to communicate using such common protocol. One specific example of such protocol is the Exchange Peer Parameter (EPP) protocol, and an implementation of the invention employing EPP will be described below. Other examples setup protocols include the existing FC SW-ILS request response based protocol.

As indicated above, the EPP protocol may be enabled as a registration/set-up protocol for TN_Ports. One procedure for detecting EPP capability will now be described. In this procedure, if EPP capability is not detected, then the peer node port and switch port do not use a VSAN-specific communication for any set-up or data traffic purposes. In this case, there will be no negotiation of VSAN parameters. And in the embodiment depicted in FIG. 2, all subsequent communication from the TN_Port will take place via the physical HBA interface.

On the other hand, if EPP capability is detected, then the TN_Port and the F_Port subsequently negotiate appropriate VSAN parameters for future data traffic. As indicated elsewhere, this entails determining common features for the link including the mode of operation, a particular port VSAN (for non-trunking applications), and a list of common VSANs to be supported by the link. Other link-related parameters may be negotiated at this time as well.

Figure 5A:
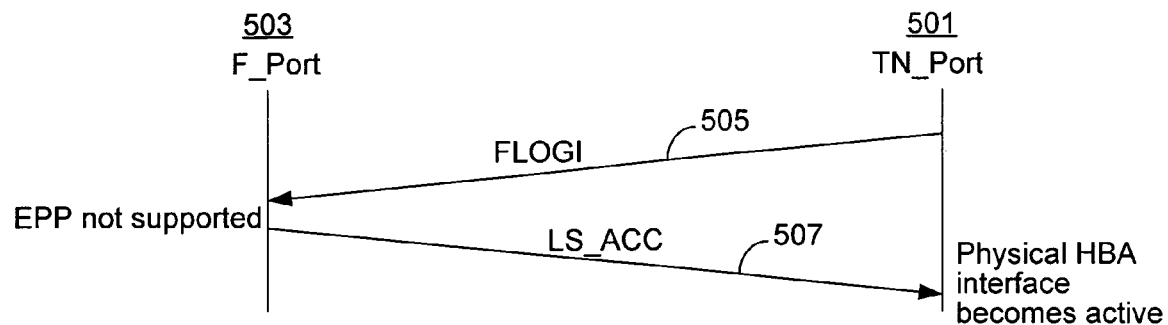
FIG. 5A is an interaction diagram showing a message exchange in which a TN_Port learns that an F_Port does not support a protocol (EPP) for determining trunking parameters on a link.
Figure 5B:
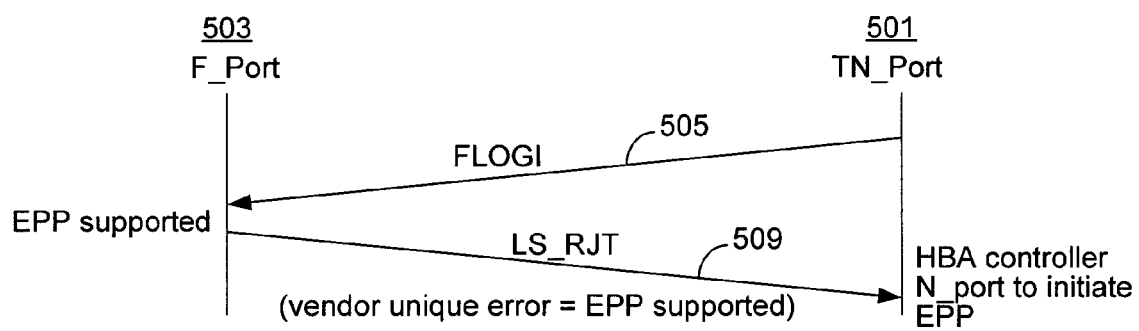
FIG. 5B is an interaction diagram showing a message exchange in which a TN_Port learns that an F_Port supports a protocol (EPP) for determining trunking parameters on a link.

One mechanism for detecting EPP capability employs the Fibre Channel log in sequence, wherein the N_Port begins the process by sending an FLOGI. This implementation is depicted in FIGS. 5A and 5B. Because Fibre Channel requires the N_Port to send an FLOGI message after link initialization, EPP detection can be conveniently implemented during this stage.

FIG. 5A depicts a scenario in which the F_Port does not support EPP and hence trunking is not enabled over the link. In this example, the TN_Port 501 begins the process with an FLOGI frame 505. This message has been slightly modified from the standard FLOGI frame format in that it has some indication that specifies to a capable F_Port that an EPP exchange is desired.

In this example, an F_Port 503 does not support EPP and/or has its trunking feature disabled. Thus, when F_Port 503 receives FLOGI frame 505, it responds in a manner indicating to TN_Port 501 that it either did not detect the indication of EPP support and/or it does not support EPP or trunking currently. In a specific embodiment, described below, the message 507 sent by F_Port 503 to indicate this is an accept message for fabric login (LS_ACC) having a fabric address.

Because TN_Port 501 now understands that F_Port 503 will not participate in the desired parameter exchange to support VSAN trunking, the physical HBA interface of the TN_Port becomes active and the link operates in a non-trunking mode. Note that even though the F_Port does not participate in the trunking negotiation, it may still support VSAN applications. It simply may not have been prepared to participate in a parameter exchange or trunking. In this case, F_Port 503 will treat all frames as belonging to its port VSAN.

FIG. 5B depicts a different scenario in which F_Port 503 supports EPP and is prepared to engage in a parameter exchange with TN_Port 501. In this case, a different fabric login exchange results. As shown there, TN_Port 501 again begins the process by sending a modified FLOGI message 505. In this case, however, F_Port 503, which supports EPP and desires to define parameters for the link, responds with a different message, one that indicates to TN_Port 501 that it should initiate parameter exchange. In the specific example depicted in FIG. 5B, F_Port 503 transmits a login reject message (LS_RJT) frame in response to the FLOGI message. This frame contains a specific indication that EPP is supported. When TN_Port 501 receives this frame, the HBA controller N_Port (assuming the FIG. 2 architecture) takes over and begins negotiation on the EPP protocol.

Various options can be employed for embedding a request for EPP communication in the FLOGI frame. In one option, the existing FLOGI frame format is employed and some field in that frame has a value specifically chosen to indicate EPP support. In one specific embodiment, a particular value is inserted into the vendor specific information field of the FLOGI frame payload. For example, a vendor version value may be set to hex 01. In addition, a 16 bit field defined for vendor specific service parameters can have a bit reserve to identify EPP support.

In another option, the standard format for FLOGI frames is modified to accommodate a flag or other indicator for EPP support. In other words, the standard is modified to define a new field understood by all devices to indicate a desire to communicate by EPP.

Correspondingly, various options exist for indicating EPP support in the F_Port reply to the FLOGI message. In the first example, the F_Port may send a reject frame (LS_RJT) as indicated in FIG. 5B. In one example, the frame includes a vendor unique error code (e.g., hex FF) with an explanation that EPP is not supported (as understood by TN_Ports). In a specific embodiment, the most significant byte of the ELS command code can be passed on in the reject message (e.g., AB when EPP uses 0xAB000000 as the ELS command code). This allows the HBA controller N_Port (assuming a FIG. 2 architecture) to use this value to receive and send EPP service frames.

In a second option, the F_Port replies to the FLOGI message by sending a conventional login accept frame (LS_ACC), but with some special indication that EPP is supported. In a specific example, the accept frame contains a fabric address of all zeros.

If FLOGI is used as the mechanism for indicating EPP support, in preparation for an exchange to define link parameters, then the F_Port may make note of the values of various parameters specified in the FLOGI message for later use during logins by the individual virtual HBAs defined during the EPP parameter exchange. The F_Port may also perform configuration of relevant hardware and software elements before sending its LS_RJT response shown in FIG. 5B. Examples of parameters that may be noted by the F_Port include BB_credit, receive data field size, E_D_TOV, etc. If any of these values is not acceptable, the F_Port may respond with an LS_RJT frame having appropriate reason codes as specified in the Fibre Channel standard. If the TN_Port receives such a rejection, it may first take care of the specified issue and then try again with another FLOGI to detect EPP capability.

Negotiation (EPP Example)

Figures 6A, 6B:
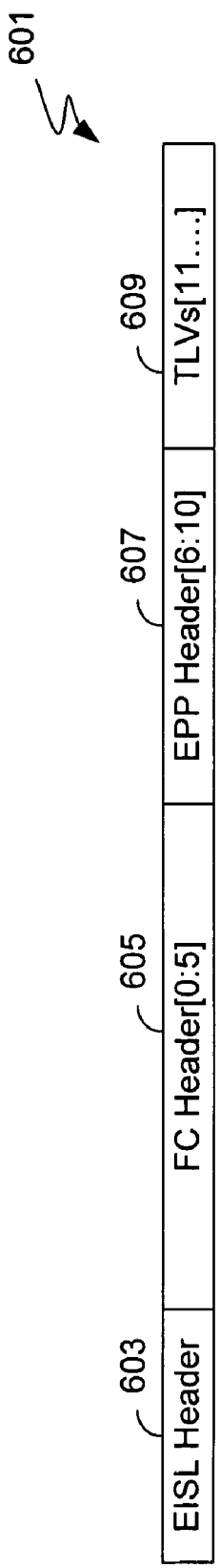
FIG. 6A is a schematic representation of an EPP frame format including TLV sections in the EPP payload.
FIG. 6B is a table showing a matrix for trunk mode negotiation between a TN_Port and an F_Port in accordance with one embodiment of this invention.

The exchange of peer parameters establishes the operating environment between the two ports on the link for subsequent support of one or more VSANs during data traffic across the link. In an embodiment described herein, this negotiation is done during the SYNC phase of EPP. An EPP frame format is shown in FIG. 6A. As illustrated there, an EPP frame 601 includes an EISL header 603, a 24 byte Fibre Channel header 605, a 20 byte EPP header 607, and multiple "TLV" payloads 609. Note that the EISL header is optional on EPP frames.

EISL header 603 indicates that trunking for multiple VSANs may be supported. As mentioned, some embodiments of the invention set aside a particular VSAN for the sole purpose of management and configuration of trunking on a node-fabric link. As an example, VSAN number 4094 may be reserved for this purpose. Regarding the appropriate fields and format for the EISL header, further discussion is provided in U.S. Patent publication No. US-2003-0118053-A1, previously incorporated by reference.

The Fibre Channel header 605 employs the format specified in the ANSI Fibre Channel standard. However, because EPP is implemented as an ELS-bases service, the Fibre Channel header format will be set forth in more detail by the ELS specification. See the ANSI T11 standard specification for Fibre Channel.

Before discussing EPP header 607, a brief introduction to EPP will be provided. EPP is a two-phase protocol in which (1) information is exchanged about peer port configurations of interest and (2) results of the exchange of information are applied to hardware and/or software of the peer ports, as needed. The first phase is referred to a "SYNC" phase and the second phase is referred to as a "COMMIT" phase. The EPP protocol may be employed for diverse purposes such as, for example, transitioning port channel configurations and negotiating ISL trunk parameters for supporting multiple VSANs. EPP is described generally in U.S. patent application Ser. No. 10/430,491, filed May 5, 2003, entitled, "METHODS AND DEVICES FOR EXCHANGING PEER PARAMETERS BETWEEN NETWORK DEVICES", Publication No. US-2004-0100910-A1, published on May 27, 2004, which is incorporated herein by reference. It is important to remember that EPP is but one example of a communication protocol that can be employed for this purpose. Generally, the communication protocol need not even be a two-phase protocol; some single-phase protocols can work equally well. As an example, the existing FC SW-ILS definition in Fibre Channel can be employed. FC SW-ILS is a request-response based protocol with delivery acknowledgement.

Returning to FIG. 6A, the EPP header 607 may also employ a well-known format. Examples of relevant fields in the EPP header include a command code, which indicates whether the EPP exchange is in the SYNC phase or the COMMIT phase, a payload length based upon a calculation involving the number of TLV segments in the payload, and a command identifier specifying whether the frame is an EPP request, an EPP accept, or an EPP reject.

In one embodiment, the command identifier for the EPP request used in the exchange to identify trunking parameters will be chosen from the range of vendor specific command identifiers. The proposed value is 0x7f000000. The values for LS_ACC and LS_RJT are specified by ELS.

In the specific embodiment described here, the EPP payload is provided as a collection of TLV sections 609 of frame 601, each specifying a particular type, length and value. The type also indicates how the EPP frame is to be handled if TLV is not supported at the receiving port. If TLV is not supported, the typical response is either skip procedures involving the TLV information or abort the EPP exchange altogether. The length component of the TLV format specifies the length of the entire TLV portion of the payload for the parameter under consideration. Finally, the value component specifies the particular value of the parameter in question.

In the embodiment described here, a separate TLV portion is employed for each parameter to be negotiated. These include the mode for communication, a specific port VSAN if communication is to take place in non-trunking mode, and a list of available VSANs to be supported in trunking mode. Together the three TLV portions for these parameters comprise the EPP payload of frame 601.

In a specific example, there are three different administrative trunk modes. The first one of these is "OFF" which explicitly indicates that the port should never operate in a trunking mode. The second mode is "ON" which explicitly indicates that the port should operate in trunking mode so long as its peer does not explicitly prohibit that. Finally, a third mode of operation is called "AUTO" which indicates that the port can operate in a trunking mode, so long as the peer is explicitly configured to support trunk mode. Each port will have its own currently activated trunk mode, which is one of these three values. The trunk mode value for that port is specified in its EPP SYNC message at the appropriate location in a TLV portion of its payload. Negotiation of the agreed upon mode for the F_Port and N_Port may be decided based upon a table as shown in FIG. 6B. As shown there, the agreed upon mode is trunking only when one of the ports has its mode set to "ON" and the other port's mode is not "OFF".

Regarding the port VSAN TLV, this portion of the EPP frame is used by the F_Port to notify its counterpart TN_Port of the VSAN number to be used when the link is operational in non-trunking mode (as determined by the trunk mode negotiation).

The allowed VSAN TLV contains a list of allowed VSANs on the port sending the EPP SYNC message. In one embodiment, the value field of the allowed VSAN TLV is structured as a bit map with a single bit designated for each VSAN identifier. For the current VSAN ID space, the TLV value field should be at least 512 bytes. The VSAN number N is represented by a bit number N, left to right. To negotiate an operational VSAN, the local port logic (a controller in case of the TN_Port) calculates using a bit-wise AND operator on the received VSAN list (for the EPP frame) and the locally configured VSAN list for that port.

Other implementations of this invention may handle additional parameters to be set up during negotiation. These additional parameters may be identified in additional TLV fields if EPP is employed as the negotiation protocol. These may enhance the functionality of the invention. Examples of other TLV-implemented parameters may include security information.

During the EPP commit phase, the ports commit negotiated configurations (decided during the sync phase) to there appropriate hardware to make these configurations operational.

As indicated, when the link is operational in trunking mode, all EPP service exchanges are preferably performed by controllers in the N_Port and F_Port using a control VSAN (e.g., 4094). If the link is operational in non-trunking mode, the EPP services may need to occur in the port VSAN of the attached F_Port. However, if the TN_Port is not aware of the port VSAN of the attached F_Port (for example, during TN_Port initialization) it may assume that the EPP service exchanges are to take place using the control VSAN.

Figure 7:
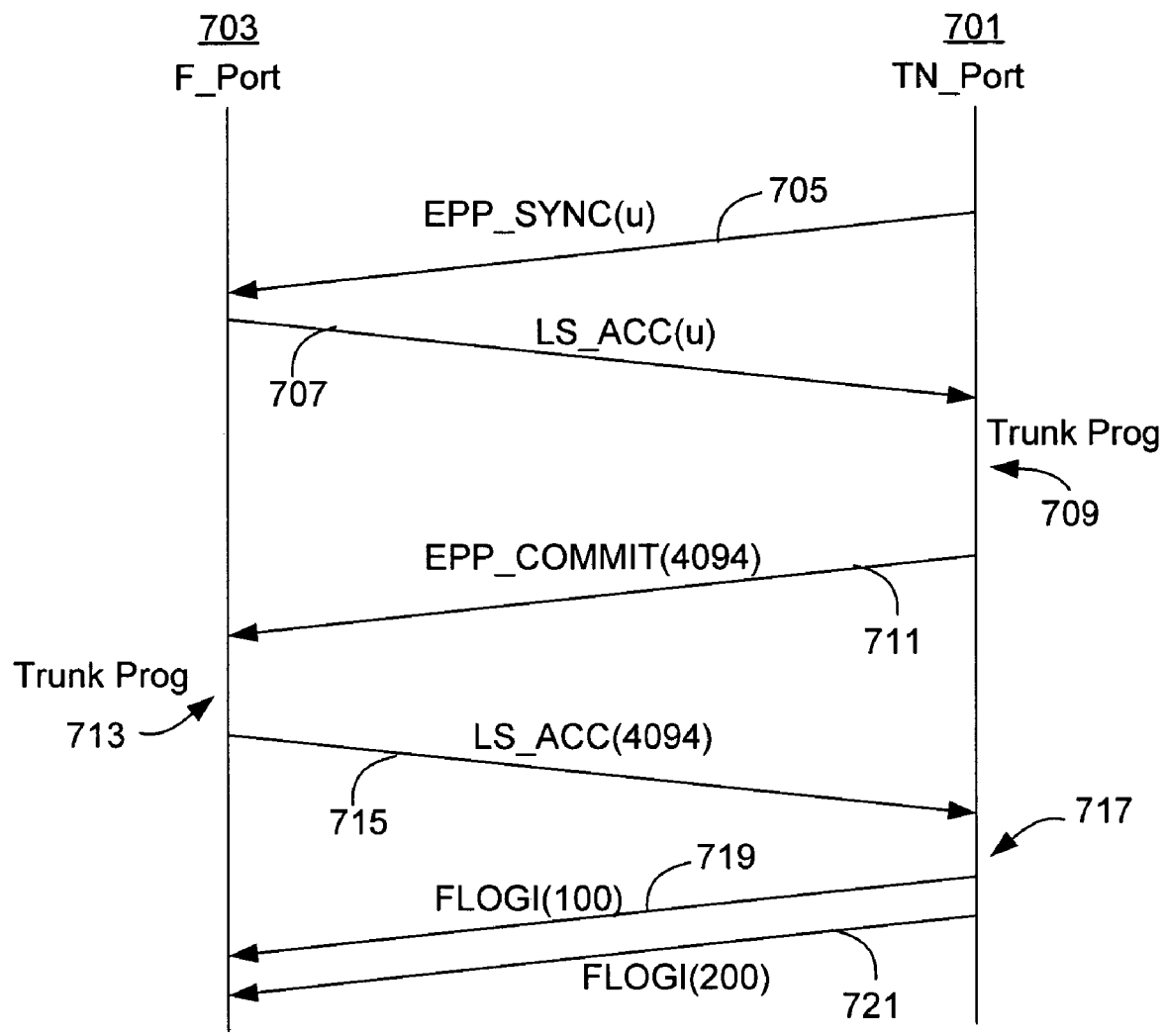
FIG. 7 is an interaction diagram showing how the EPP protocol may be used to negotiate trunking parameters in accordance with one embodiment of this invention.

An example of the negotiation and login protocol is depicted in FIG. 7. As shown there, a TN_Port 701 initiates the EPP sequence by sending an EPP_SYNC frame 705 to an F_Port 703. In the architecture depicted in FIG. 2, the frame will be created as instructed by the HBA controller N_Port using the control VSAN (e.g. 4094). In this example, however, the EPP_SYNC exchange will be transmitted in an untagged format; note the designation "u" in the message sequence. Upon receiving the EPP_SYNC frame, F_Port 703 will respond back with an LS_ACC frame 707 (also in untagged format) with its configuration information, which includes its trunk mode and VSAN list. Note that EPP_SYNC frame 705 also included this configuration information for the TN_Port.

If the LS_ACC frame 707 is received by TN_Port 701, then the port applies the rules for parameter negotiation to determine the operational trunk mode and the list of operational VSANs on the link. See action 709 in FIG. 7. Assuming that the operational trunk mode is ON, then TN_Port 701 will do the necessary hardware and software programming to transmit frames in tagged format and then send an EPP_COMMIT frame 711 from the control VSAN. Thus, this exchange occurs in VSAN 4094.

On receiving the EPP_COMMIT frame 711, F_Port 703 then does its own corresponding hardware and software programming to enable transmission of frames in tagged format. See action 714 in FIG. 7. The F_Port also responds back with an LS_ACC frame 715, upon successful completion of its own configuration. F_Port 703 will also notify its local applications about the availability of VSANs on that port.

When LS_ACC message 715 is received by TN_Port 701, it notifies its local operation about the availability of VSANs, which will trigger FLOGIs in each of those VSANs. See action 717 in FIG. 7. Then, the individual virtual HBA interfaces on TN_Port 701 perform FLOGI in their respective VSANs. As depicted in FIG. 7, these are VSANs 100 and 200. FLOGIs 719 and 721 correspond to FLOGIs 313 and 315 in FIG. 3. The various login parameters (except the port WWN) in these FLOGIs should be the same as in the first FLOGI. This enables the active virtual HBA interface(s) to support data traffic per Fibre Channel standards.

Modification of Trunking During Operation

Various modifications may occur to an operating link between an F_Port and a TN_Port. These modifications can be effected in many different ways using many different protocols. Some examples will now be described.

As an initial matter, note that if the link is in a non-trunking mode and new VSANs are added or existing VSANs are deleted, then there is no need to undertake a parameter exchange by EPP or any other protocol, as the change in active VSANs will not effect the operational state of the link until it becomes trunking.

The situation is different if the link is already trunking and the VSAN configuration is to be changed with the addition or deletion of VSANs (on either the F_Port or the TN_Port). Then an EPP exchange may be initiated by either side of the link. The side initiating EPP will, in this embodiment, send an EPP_SYNC frame with the new VSAN configuration. As in the above scenarios, this exchange is conducted in a control VSAN. The receiver of the EPP_SYNC frame will respond back with an LS_ACC message identifying its current trunk configuration. When the initiator receives this LS_ACC message, it will do the necessary hardware and software programming to effect the changes in the operational VSANs. On completion of the programming, it will send an EPP_COMMIT frame to its peer. Then, on receiving the EPP_COMMIT frame, the receiver will do the necessary hardware and software programming on its end to reflect the changes in operational VSANs. When it completes this, it will respond with an LS_ACC frame to the initiator and also notify its local applications about the availability of the new VSANs. When receiving the LS_ACC frame, the initiator will notify its local applications about the availability of the new VSANs. Finally, availability of the VSANs on the TN_Port will trigger submission of FLOGI message from the TN_Port, as before. Note that in this scenario, where the link is already trunking before the VSAN configuration has changed, all communications associated with the change take place in tagged format.

It is also possible that during normal operation, the trunk mode could change from trunking to non-trunking. This may arise if the mode of operation was changed from ON to OFF or AUTO in a port at one end of the link. If the port where this change is occurring is transitioning from ON mode to AUTO mode, then that port will need to initiate an exchange to determine if the link should continue to operate as trunking or will become non-trunking. This will depend on whether the other port is currently in ON or AUTO mode, as indicated in the table of FIG. 6B.

If the link is to become non-trunking, then it will be re-initialized by the F_Port. This is to avoid any merging of VSAN specific traffic into non-tagged traffic. In particular, if a link was supporting traffic in VSANs 100 and 200, while operational as trunking, then when one side is programmed to become non-trunking, VSAN specific traffic coming out of that port will be transmitted without an EISL header. The receiver will then receive untagged frames, which will be processed in the port VSAN of the receiver.

Note that, in this embodiment, a trunk mode change from trunking to non-trunking will be disruptive on the link. Link re-initialization entails a complete re-initialization of the link, including standard primitive sequences and the FLOGI request-response exchange followed by EPP parameter negotiation as described earlier.

The final scenario to be described involves a change from non-trunking mode to trunking. In one embodiment, the side on which the trunk mode is changed will initiate EPP by sending an EPP_SYNC payload. This exchange will be conducted in the port VSAN of the attached F_Port. The peer receiving EPP_SYNC frame will respond back with an LS_ACC frame presenting its own trunk configuration information. When the initiator receives the LS_ACC frame, it will determine the new operational trunk mode and the list of operational VSANs. Using this information, it will do the necessary hardware and/or software programming. On successful completion of this programming, it will send an EPP_COMMIT frame to its peer. When the peer receives this message, it will also determine the new operational trunk mode and the list of operational VSANs. The receiver will then also do the necessary programming on its side and then send an LS_ACC frame back to the initiator. It will also notify its local applications about the availability of VSANs. When the initiator receives the LS_ACC frame, it will notify its local applications about the newly available VSANs. Regardless of whether the F_Port or the TN_Port initiated the mode change from non-trunking to trunking, the TN_Port will initiate fabric login for each of the new VSANs by sending FLOGI messages from its virtual HBA interfaces (assuming an architecture as depicted in FIG. 2).

In the above-described procedure for transitioning from non-trunking to trunking mode, the transition is non-disruptive. In other words, the transition did not involve link re-initialization. In an alternative embodiment, the transition to trunking mode may be disruptive. In other words, the transition would involve a complete re-initialization including standard primitive sequences as well as the FLOGI request-response exchange and the EPP negotiation as described above.

Device Implementation

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch, particularly a Fibre Channel switch. Such network devices may have multiple network interfaces including frame relay and ISDN interfaces, for example.

For example, the methods of this invention may be implemented in specially configured network devices such as the MDS 9000 family of switches manufactured by Cisco Systems, Inc. of San Jose, Calif. A generalized architecture for some such machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 8:
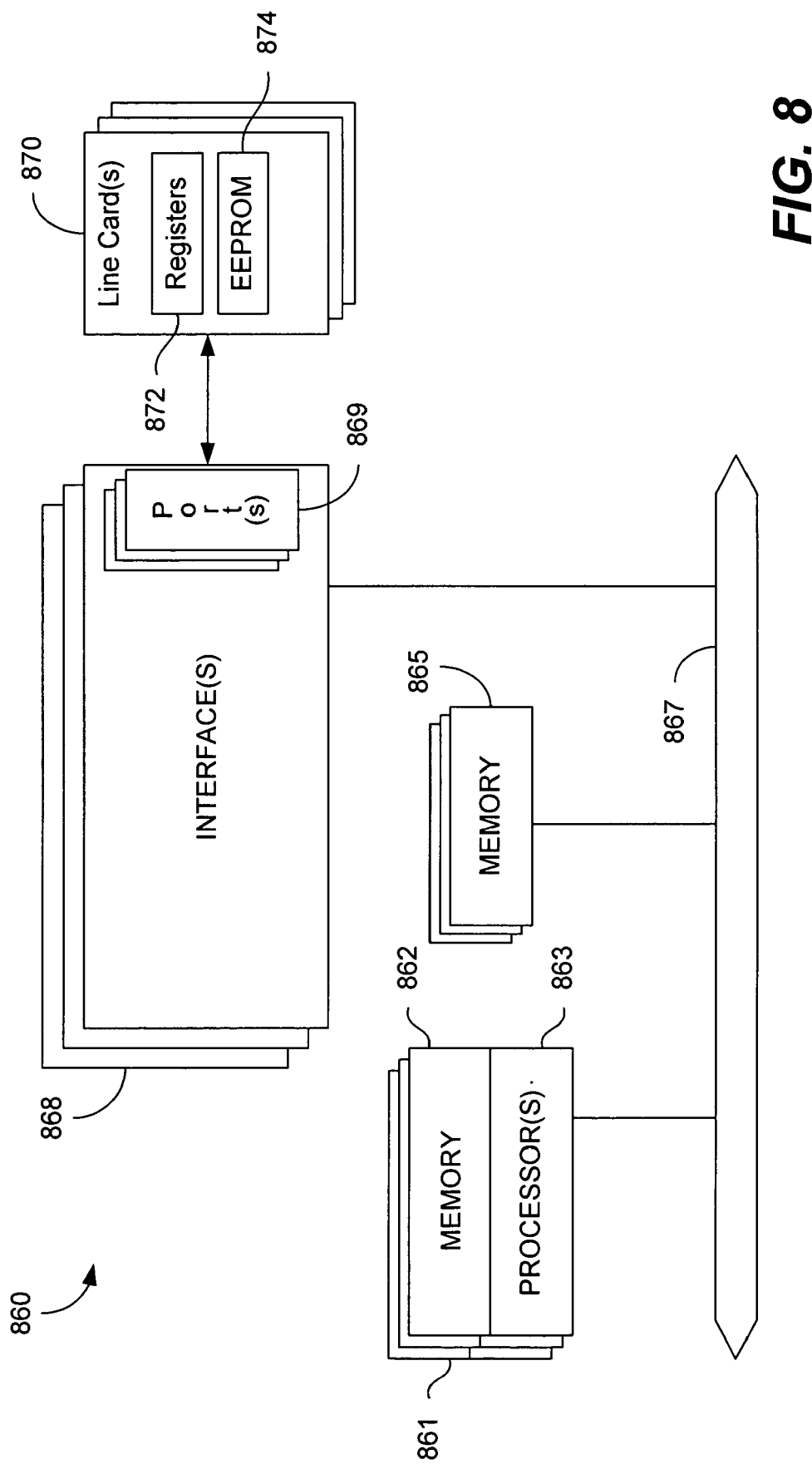
FIG. 8 depicts a switch or other network device that may be configured to perform the methods of the present invention.

Referring now to FIG. 8, a network device 860 suitable for implementing the techniques of the present invention includes a master central processing unit (CPU) 862, interfaces 868, and a bus 867 (e.g., a PCI bus). When acting under the control of appropriate software or firmware, the CPU 862 may be responsible for implementing specific functions associated with the functions of a desired network device. For example, the CPU 862 may be responsible for analyzing frames, encapsulating frames, and forwarding frames for transmission on an inter-switch link. The CPU 862 preferably accomplishes all these functions under the control of software including an operating system (e.g. Windows NT), and any appropriate applications software.

CPU 862 may include one or more processors 863 such as a processor from the Motorola family of microprocessors or the MIPS family of microprocessors. In an alternative embodiment, processor 863 is specially designed hardware for controlling the operations of network device 860. In a specific embodiment, a memory 861 (such as non-volatile RAM and/or ROM) also forms part of CPU 862. However, there are many different ways in which memory could be coupled to the system. Memory block 861 may be used for a variety of purposes such as, for example, caching and/or storing data, programming instructions, etc.

The interfaces 868 are typically provided as interface cards (sometimes referred to as "line cards"). Generally, they control the sending and receiving of data packets over the network and sometimes support other peripherals used with the network device 860. Among the interfaces that may be provided are Fibre Channel interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of the network device's configuration, it may employ one or more memories or memory modules (such as, for example, memory block 865) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; semiconductor memory media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

OTHER EMBODIMENTS

While the invention has been particularly shown and described with reference to specific embodiments thereof, it will be understood by those skilled in the art that changes in the form and details of the disclosed embodiments may be made without departing from the spirit or scope of the invention. For instance, while the above protocol has been described for trunking N_Port and F_Port applications, it may be easily extended to work with devices attached to loop ports if such protocol is supported by the respective device vendors. Further this invention may be extended to network technologies other than Fibre Channel. Considering these and other variations, the scope of the invention should be determined with reference to the appended claims.

What is claimed is:

1. A trunking N_Port for a Fibre Channel node, the trunking N_Port comprising:
   a physical N_Port interface designed or configured to provide functionality of a non-trunking N_Port when virtual Storage Area Network (SAN) functionality is not available; and
   a controller for managing trunking on the trunking N_Port, wherein the controller is designed or configured to communicate with an F_Port on a Fibre Channel switch and determine whether virtual SAN functionality exists on the F_Port and if so define one or more virtual SAN interfaces on the trunking N_Port for one or more virtual SANs that are common to the F_Port and the trunking N_Port, with each of the virtual SAN interfaces providing the functionality of an N_Port for a corresponding one of the one or more virtual SANs that are common to the F_Port and the trunking N_Port;
   wherein the controller is designed or configured to identify the one or more virtual SANs that are common to the F_Port and the trunking N_Port, to thereby define the one or more virtual SAN interfaces on the trunking N_Port.

2. The trunking N_Port of claim 1, wherein the trunking N_Port is implemented at least partially as software.

3. The trunking N_Port of claim 1, further comprising one or more instances of said virtual SAN interfaces.

4. The trunking N_Port of claim 1, wherein the physical N_Port functionality provides no information regarding virtual SANs in frames transmitted therefrom.

5. The trunking N_Port of claim 1, wherein each of one or more of the virtual SAN interfaces is designed or configured to provide frames containing information identifying the corresponding one of the one or more virtual SANs.

6. The trunking N_Port of claim 5, wherein the information identifying the particular virtual SAN to which it belongs is provided in an Extended Inter-Switch Link (EISL) header for the frames.

7. The trunking N_Port of claim 5, wherein the frames comprise QoS parameters defining levels of quality of service available for the virtual SANs.

8. The trunking N_Port of claim 1, wherein the controller is designed or configured to communicate with the F_Port using Exchange Peer Parameter (EPP) protocol.

9. The trunking N_Port of claim 1, wherein the controller has a Fibre Channel well known address but is designed or configured such that it does not take part in data traffic.

10. The trunking N_Port of claim 1, wherein the controller is designed or configured to negotiate a mode of operation with the F_Port and available modes of operation include trunking and non-trunking 11. The trunking N_Port of claim 1, wherein the controller is designed or configured to use EPP protocol to identify the VSANs common to the F_Port and the trunking N_Port.

12. The trunking N_Port of claim 1, wherein the controller is designed or configured to identify the one or more virtual SANs that are common to the F_Port and the trunking N_Port based upon a list of supported virtual SANs that is received from the F_Port, the list of supported virtual SANs identifying the one or more virtual SANs.

13. The trunking N_Port of claim 1, wherein the one or more virtual SANs that are common to the F_Port and the trunking N_Port includes two or more virtual SANs, wherein the controller defines two or more virtual SAN interfaces on the trunking N_Port for the two or more virtual SANs, with each of the two or more virtual SAN interfaces providing the functionality of an N_Port for a corresponding one of the two or more virtual SANs, thereby enabling the trunking N_Port to carry traffic for the two or more virtual SANs over a single link between the trunking N_Port and the F_Port.

14. A trunking N_Port or F_Port for a Fibre Channel device, the trunking N_Port or F_Port comprising a controller for managing trunking on the trunking N_Port or F_Port, wherein the controller is designed or configured to communicate with a peer port over a Fibre Channel link and determine whether virtual SAN functionality exists on the peer port and if so define one or more virtual Storage Area Network (SAN) interfaces on the trunking N_Port or F_Port for one or more virtual SANs that are common to the trunking N_Port or F_Port and the peer port, with each of the virtual SAN interfaces providing the functionality of a corresponding one of the one or more virtual SANs that are common to the trunking N_Port or F_Port and the peer port, wherein the controller is further designed or configured to identify the one or more virtual SANs that are common to the trunking N_Port or F_Port and the peer port, to thereby define the one or more virtual SAN interfaces on the trunking N_Port or F_Port.

15. The trunking N_Port or F_Port of claim 14, wherein the controller is designed or configured to negotiate a mode of operation with the peer and available modes of operation include trunking and non-trunking 16. The trunking N_Port or F_Port of claim 14, wherein the controller is designed or configured to identify the VSANs common to the F_Port or the trunking N_Port and the peer port based upon a list of supported virtual SANs that is received from the peer port, the list of supported virtual SANs identifying the one or more virtual SANs, to thereby define the one or more virtual SAN interfaces on the trunking N_Port or F_Port.

17. The trunking N_Port or F_Port of claim 15, wherein the controller is designed or configured to use Exchange Peer Parameter (EPP) protocol to identify VSANs common to the F_Port and the trunking N_Port.

18. The trunking N_Port or F_Port of claim 14, wherein each of the virtual SAN interfaces providing the functionality of a corresponding one of the one or more virtual SANs that are common to the trunking N_Port or F_Port and the peer port by providing frames containing information identifying the corresponding one of the one or more virtual SANs.

19. A storage area network comprising:
   (a) two or more nodes, each comprising a trunking N_Port coupled to a Fibre Channel link; and
   (b) one or more Fibre Channel switches comprising multiple F_Ports in communication with the trunking N_Ports and defining a fabric allowing communication among the two or more nodes,
   wherein the trunking N_Ports comprise controllers designed or configured to communicate with F_Ports on a Fibre Channel switch and determine whether virtual Storage Area Network (SAN) functionality exists on the F_Ports and if so define one or more virtual SAN interfaces on their trunking N_Ports for one or more virtual SANs that are common to the trunking N_Ports and the F_Ports, with each of the one or more virtual SAN interfaces providing the functionality of an N_Port for a corresponding one of the one or more virtual SANs, wherein each of the controllers is further designed or configured to identify virtual SANs that are common to the corresponding one of the trunking N_Ports and a corresponding one of the F_Ports, to thereby define the one or more virtual SAN interfaces on the trunking N_Ports.

20. The storage area network of claim 19, wherein the two or more nodes comprise one or more storage nodes and one or more host nodes.

21. The storage area network of claim 19, wherein the controllers communicate with the F_Ports using Exchange Peer Parameter (EPP) protocol.

22. The storage area network of claim 19, wherein the controllers employ the Exchange Peer Parameter (EPP) protocol to identify VSANs common to the F_Ports and the trunking N_Ports.

23. A method of establishing a link between a trunking N_Port on a node and an F_Port on a Fibre Channel switch, the method comprising:
(a) determining whether virtual Storage Area Network (SAN) functionality exists on the F_Port; and
(b) defining two or more virtual SAN interfaces on the trunking N_Port, with each of the two or more virtual SAN interfaces providing the functionality of an N_Port for a corresponding one of two or more virtual SANs that are supported by the link between the trunking N_Port and the F_Port, wherein the functionality of an N_Port for a corresponding one of the two or more virtual SANs includes transmitting frames containing information identifying the corresponding one of the two or more virtual SANs.

24. The method of claim 23, wherein (a) and (b) are both implemented by communicating between the trunking N_Port on a node and the F_Port, the method further comprising:
identifying the two or more virtual SANs that are supported by the link between the trunking N_Port and the F_Port.

25. The method of claim 24, wherein the communicating comprises exchanging frames in Exchange Peer Parameter (EPP) protocol.

26. The method of claim 23, further comprising transmitting frames from one of the two or more of the virtual SAN interfaces, which frames containing information identifying the corresponding one of the two or more virtual SANs to which it belongs.

27. The method of claim 26, wherein the information identifying the particular virtual SAN to which it belongs is provided in an Extended Inter-Switch Link (EISL) header for the frames.

28. The method of claim 26, wherein the frames comprise QoS parameters defining levels of quality of service available for the virtual SANs.

29. The method of claim 23, further comprising conducting a negotiation between the trunking N_Port and the F_Port to determine a mode of operation with the F_Port, wherein available modes of operation include trunking and non-trunking.

30. A computer program product comprising a non-transitory computer-readable storage medium on which is provided program instructions for establishing a link between a trunking N_Port on a node and an F_Port on a Fibre Channel switch, wherein the program instructions comprise:
(a) code for determining by the N_Port whether virtual Storage Area Network (SAN) functionality exists on the F_Port;
(b) code for defining one or more virtual SAN interfaces on the trunking N_Port for one or more virtual SANs that are supported by the link between the trunking N_Port and the F_Port, with each of the virtual SAN interfaces providing the functionality of an N_Port for a corresponding one of the one or more virtual SANs that are supported by the link between the trunking N_Port and the F_Port; and
(c) code for identifying the one or more virtual SANs that are supported by the link between the F_Port and the trunking N_Port, to thereby define the one or more virtual SAN interfaces on the trunking N_Port.

31. The computer program product of claim 30, wherein the program code for both (a) and (c) comprises code for communicating between the trunking N_Port on a node and the F_Port.

32. The computer program product of claim 31, wherein the code for communicating comprises code for exchanging frames in Exchange Peer Parameter (EPP) protocol.

33. The computer program product of claim 30, further comprising code for transmitting frames from the one or more of the virtual SAN interfaces, which frames containing information identifying the corresponding one of the one or more virtual SANs to which it belongs.

34. The computer program product of claim 33, wherein the code for transmitting frames comprises code for providing an Extended Inter-Switch Link (EISL) header for the frames.

35. The computer program product of claim 33, wherein the code for transmitting frames comprises code for providing QoS parameters defining levels of quality of service available for the virtual SANs.

36. The computer program product of claim 30, further comprising code for conducting a negotiation between the trunking N_Port and the F_Port to determine a mode of operation with the F_Port, wherein available modes of operation include trunking and non-trunking.

37. A trunking N_Port for a Fibre Channel node, the trunking N_Port comprising:
(a) means for determining whether virtual Storage Area Network (SAN) functionality exists on a F_Port to which the trunking N_Port is linked;
(b) means for defining one or more virtual SAN interfaces on the trunking N_Port for one or more virtual SANs that are supported by the F_Port, with each of the virtual SAN interfaces providing the functionality of an N_Port for a corresponding one of the one or more virtual SANs that are supported by the F_Port; and
(c) means for identifying the one or more virtual SANs that are supported by the F_Port, to thereby define the one or more virtual SAN interfaces on the trunking N_Port.

38. The trunking N_Port of claim 37, wherein the means for determining is designed or configured to exchange frames in Exchange Peer Parameter (EPP) protocol.

39. The trunking N_Port of claim 37, further comprising means for transmitting frames from the one or more of the virtual SAN interfaces, which frames containing information identifying the corresponding one of the one or more virtual SANs to which it belongs.

40. The trunking N_Port of claim 39, wherein the information identifying the particular virtual SAN to which it belongs is provided in an Extended Inter-Switch Link (EISL) header for the frames.

41. The trunking N_Port of claim 39, wherein the frames comprise QoS parameters defining levels of quality of service available for the virtual SANs.

42. The trunking N_Port of claim 37, further comprising means for conducting a negotiation between the trunking N_Port and the F_Port to determine a mode of operation with the F_Port, wherein available modes of operation include trunking and non-trunking.

* * * * *